United States Patent [19]

Johnson et al.

[11] Patent Number: 5,533,842
[45] Date of Patent: Jul. 9, 1996

[54] PORTABLE PECK FEED DRILLING SYSTEM

[75] Inventors: Chris L. Johnson, Plainwell, Mich.; Edwin J. Deremo, Lexington, S.C.

[73] Assignee: Cooper Industries, Inc., Houston, Tex.

[21] Appl. No.: 346,326

[22] Filed: Nov. 29, 1994

Related U.S. Application Data

[63] Continuation of Ser. No. 839,974, Feb. 21, 1992, abandoned.

[51] Int. Cl.⁶ ............................................ B23B 47/22
[52] U.S. Cl. ......................... 408/17; 408/130; 408/702
[58] Field of Search .............................. 408/17, 130, 702

[56] References Cited

U.S. PATENT DOCUMENTS

| | | | |
|---|---|---|---|
| 2,579,459 | 12/1951 | Allen | 77/32.3 |
| 2,601,434 | 6/1952 | Du Bois | 77/40 |
| 2,604,759 | 7/1952 | Smith . | |
| 2,607,197 | 8/1952 | Johnson . | |
| 2,625,844 | 1/1953 | Beckett et al. | 77/33.7 |
| 2,657,595 | 11/1953 | Shaff . | |
| 2,686,440 | 8/1954 | Van Custem | 77/55 |
| 2,791,922 | 5/1957 | Robinson | 77/34.4 |
| 2,852,965 | 9/1958 | Wallace | 77/32.3 |
| 2,854,871 | 10/1958 | Stratman . | |
| 2,857,789 | 10/1958 | Robinson . | |
| 2,860,531 | 11/1958 | DeGroff . | |
| 2,881,589 | 4/1959 | Hitt et al. . | |
| 2,909,949 | 10/1959 | Winslow | 77/13 |
| 2,977,826 | 4/1961 | Radford | 77/32.3 |
| 3,004,271 | 10/1961 | Hayes | 10/129 |
| 3,041,897 | 7/1962 | Linsker . | |
| 3,141,509 | 7/1964 | Bent . | |
| 3,220,031 | 11/1965 | Supernor | 10/129 |
| 3,266,580 | 8/1966 | Clapp et al. . | |
| 3,286,555 | 11/1966 | Klancik | 77/32.3 |
| 3,301,333 | 1/1967 | Linsker | 408/130 |
| 3,318,391 | 5/1967 | Linsker | 408/130 |
| 3,357,275 | 12/1967 | Green et al. | 74/606 |
| 3,398,609 | 8/1968 | Schott | 77/7 |
| 3,603,206 | 9/1971 | Quackenbush . | |
| 3,609,054 | 9/1971 | Nyman . | |
| 3,680,970 | 8/1972 | Deschner | 406/17 |
| 3,773,117 | 11/1973 | Dussel . | |
| 3,874,808 | 4/1975 | Zaccardelli et al. | 408/1 |
| 3,927,583 | 12/1975 | Parson et al. | 82/2.5 |
| 3,955,629 | 5/1976 | Turner | 173/19 |
| 4,087,137 | 5/1978 | Voitas | 308/237 R |
| 4,123,187 | 10/1978 | Turner | 408/17 |
| 4,123,188 | 10/1978 | Deremo et al. | 408/17 |
| 4,152,091 | 5/1979 | Kucera | 408/146 |
| 4,157,231 | 6/1979 | Phillips | 408/1 R |
| 4,169,637 | 10/1979 | Voitas | 308/241 |
| 4,233,885 | 11/1980 | Deschner | 91/410 |
| 4,241,483 | 12/1980 | Voitas | 29/149.5 PM |
| 4,257,314 | 3/1981 | Deschner | 92/5 R |
| 4,257,499 | 3/1981 | Deschner | 188/287 |
| 4,269,550 | 5/1981 | DiGiulio | 408/241 B |
| 4,362,444 | 12/1982 | Watkins | 408/17 |
| 4,371,297 | 2/1983 | Hirose | 408/17 |
| 4,421,441 | 12/1983 | Hirose | 408/17 |
| 4,452,552 | 6/1984 | Watkins | 408/14 |
| 4,507,026 | 3/1985 | Lund | 408/72 B |
| 4,534,683 | 8/1985 | Colliau | 408/17 |
| 4,538,943 | 9/1985 | Clifton | 408/14 |
| 4,588,334 | 5/1986 | Khurana | 408/61 |
| 4,594,030 | 6/1986 | Weigel, Jr. | 408/10 |
| 4,606,001 | 8/1986 | Rieben et al. | 364/167 |
| 4,674,927 | 6/1987 | Khurana | 408/56 |
| 4,752,161 | 6/1988 | Hill | 408/130 |
| 4,764,060 | 8/1988 | Khurana | 408/14 |
| 4,867,617 | 9/1989 | Maass et al. | 408/17 |
| 4,961,675 | 10/1990 | Stewart | 408/1 R |
| 5,001,826 | 3/1991 | Stewart et al. | 29/464 |
| 5,073,068 | 12/1991 | Jinkins et al. | 408/17 |

FOREIGN PATENT DOCUMENTS

| | | |
|---|---|---|
| 2049469 | 5/1971 | Germany . |
| 1456679 | 12/1973 | United Kingdom ................. 408/324 |

OTHER PUBLICATIONS

Oper Guide/Ser Manual for 92A Series Keller Airfeedrill/Gard–Den 36 Pg.
Parts List Gard–Den HT-1 Series Peck Drills PL92–250/Cooper Air–18 pgs.
Parts List Gard–Den HT-2 Series Peck Drlls PL92–275/Cooper Air–17 pgs.
Parts List Gard–Den HT-3 Series Peck Drills PL92–280/Cooper Air–18 pgs.
Self–Feed Air Powered Drilling Units (Sec. 3)/The Aro Equip Co (2 pgs).
Quality One–Pass Drilling for the Aerospace Indus./The Aro Corp 2 pgs.
Keller Series 92A "Airfeedrills"—Keller Tool Co.—12 pages.
Drill Bushing Tips—Gardner–Denver Co—3 pages.

*Primary Examiner*—Daniel W. Howell
*Attorney, Agent, or Firm*—Burns, Doane, Swecker & Mathis

[57] ABSTRACT

A peck feed drill incorporates a motor gear quill and a feed control assembly together on a moving race track shaped piston. External construction of the housing permits mounting of an indexing adaptor plug for attachment of drill bushings. Internal construction of the housing provides for passage of air to the various components to which control tool operation. Valves within the air logic circuitry are multi-functional to minimize the number of parts.

26 Claims, 16 Drawing Sheets

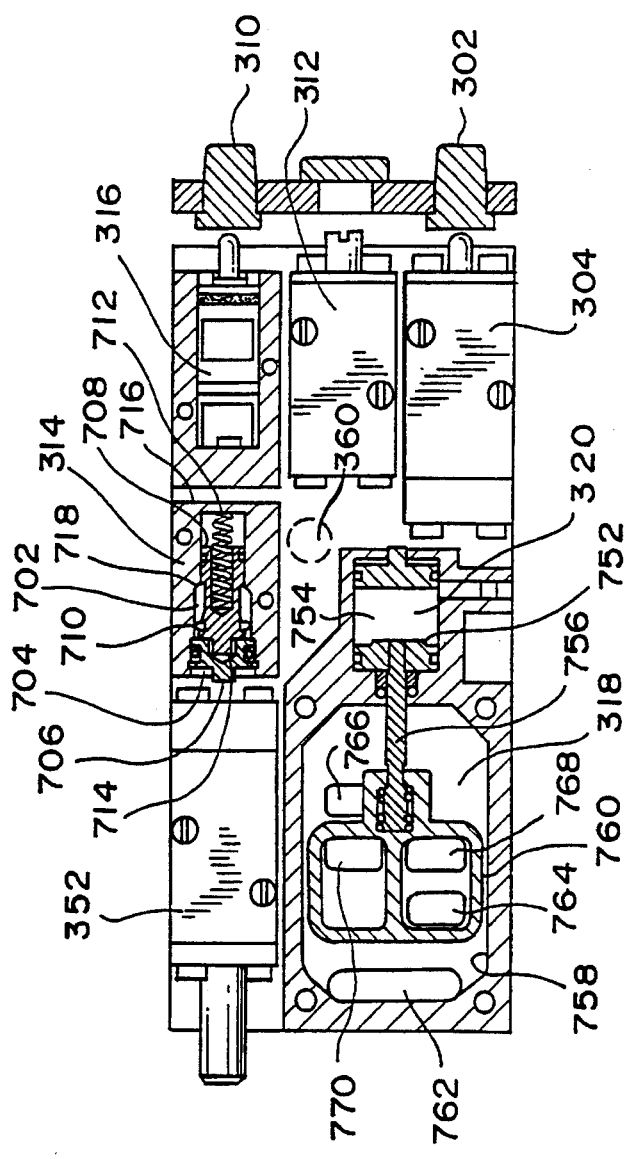
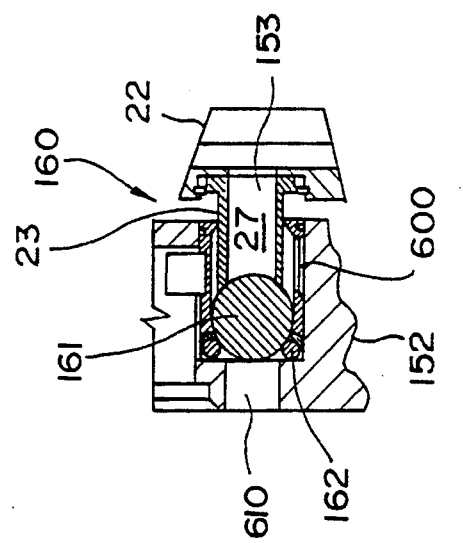
FIG. 6
FIG. 7

FIG. 16

PORTABLE PECK FEED DRILLING SYSTEM

This is a continuation of application Ser. No. 07/839,974 filed on Feb. 21, 1992 now abandoned.

BACKGROUND OF THE INVENTION

The present invention pertains to drills. More particularly, the present invention pertains to peck feed drills.

Peck feed drills are specially designed automatic drilling machines. Peck feed drills have particular application with exotic materials or when a smooth straight hole through a workpiece is absolutely essential. The greatest use of peck feed drills is in the aircraft industry.

The theory of operation of peck feed drills is easy to understand. A rotating drill bit moves into the workpiece being drilled, revolves a few turns, then retracts out of the workpiece. The retraction of the rotating drill bit from the workpiece causes the chip formed by the rotating drill bit to break off the workpiece and be extracted from the partially drilled hole. Because the rotating drill bit repeatedly returns to the workpiece until the hole is completely drilled, the process has become known as peck feed drilling.

To assure that the rotating drill bit is properly guided into the partially drilled hole in the workpiece, the rotating drill bit passes through a drill bushing. The drill bushing is held in place by a fixture. The fixture, in turn, is mounted to the workpiece. The drill bushing assures accurate positioning of the rotating drill bit each time it reenters the partially drilled hole.

Prior art peck feed drills have been either pneumatically or electrically operated. These prior art peck feed drills all have several things in common. First, they include a motor and gear assembly for rotating the drill bit. This is usually called a motor-gear quill. Second, they include a system for advancing and retracting the rotating drill bit. Third, they include a system for controlling the position and velocity of the rotating drill bit relative to the hole in the workpiece. This is usually called a feed control assembly.

Most critical in peck feed drilling systems is the feed control assembly. It is this system which governs the travel of the rotating drill bit. Control of the travel of the rotating drill bit just before it hits the bottom of the partially drilled hole and the actual advancement of the rotating drill bit while actually cutting metal at the bottom of the partially completed hole are essential.

Because of the complexity of peck feed drills and the mechanisms used to control them, most peck feed drills are found in large, fixed installations. This is because many of ordinary skill in the art believe that to assure a straight hole, the motor-gear quill and the system for advancing and retracting the rotating drill bit must be in a straight line. Such construction may be generally seen in U.S. Pat. No. 4,123,188.

The first significant departure from the straight line construction appeared in application Ser. No. 114,954 filed Oct. 30, 1987 now abandoned, to the same assignee. Therein, the motor-gear quill was placed off the centerline of the air cylinder which advanced and retracted the rotating drill bit. This re-location of the advancing and retracting mechanism off the center line of the rotating drill bit greatly reduced length and effectively made peck feed drills portable.

Portable peck feed drills have particular application when there is a large workpiece which cannot be moved to a fixed installation. One example of such a workpiece is an aircraft wing. It is more convenient to bring the peck feed drill to the wing rather than to bring the wing to the peck feed drill. This need to move peck feed drills easily and quickly to different workpieces has created an increasing need for smaller, more portable peck feed drills.

Size and weight are always key considerations when selecting portable peck feed drills. This is because the smaller the size and the lower the weight, the greater the utility of the peck feed drill. Therefore, a continuing need exists to develop a portable peck feed drill whose size and weight are small enough to enable the use of peck feed drilling techniques where they have never been used before. As with many power tools, small decreases in size are accompanied by great difficulties in design and manufacture. It must be recognized that while reducing the size and weight of peck feed drills is a design goal, there can be no compromise in the accuracy provided and the hole quality produced.

SUMMARY OF THE INVENTION

The peck feed drill of the present invention responds to the need for a lighter and smaller peck feed drill. To meet this need, systems within the new peck feed drill of the present invention were combined to perform multiple functions. For example, the air supply to the motor was combined with the air supply to move the rotating drill toward the workpiece.

To reduce tool size, the entire feed control assembly moves with the motor quill assembly during each peck of the peck feed drill. The peck feed drill of the present invention features a combined piston assembly which moves both the feed control assembly and the motor gear quill together. In many prior art peck feed drills, the feed control assembly remains stationary. Causing the feed control assembly to move necessitated a new cushioning system at the end of the rapid advance and rapid retraction strokes. Cushioning at the end of the rapid advance stroke is mechanical while cushioning is pneumatic at the end of the retraction stroke.

The reduced size of the peck feed drill of the present invention results from integrating within its housing: i) guide paths for the feed control and motor gear quill assemblies, ii) support for the motor gear quill assembly and iii) an adaptor plug which connects the housing directly to a drill bushing.

The adaptor plug may be mounted to the front of the housing of the peck feed drill in a variety of positions. The system to secure the adaptor plug to the front of the housing gives a visual and tactile indication to the operator when the plug is loose. Such use of an adaptor plug eliminates the need for a conventional nosepiece normally used on prior art peck feed drills when drilling wings and other aircraft assemblies.

Because of the need to assure a high airflow for maximum performance of the motor in the peck feed drill, there is a need to provide valving which is small, yet permits controlled passage of the necessary volume of air. The peck feed drill of the present invention includes a special power valve and special pulse valve. These special valves provide the required volume of air flow yet are small enough to not violate the design criteria of low weight and small size.

To reduce the complexity of the air flow within the peck feed drill of the present invention, the number of internal air passages has been drastically reduced over prior art peck feed drills. This reduction in the number of air passages has been accomplished by using internal parts of the drill as air flow passages and valves. Such double utilization of parts results in a decrease in overall size and weight and enhances drill serviceability.

Finally, the controlling air logic circuitry of the present invention is unique in that it uses internal valves for multiple functions. This further reduces the size and weight of the drill.

BRIEF DESCRIPTION OF THE DRAWINGS

A better understanding of the operation and construction of the peck feed drill of the present invention may be had by reference to the drawings wherein:

FIG. 6 is a sectional view located as shown between points 6—6 in FIG. 4 showing the air logic module including the power valve, pulse valve and stop valve; and FIG. 7 is a cross-sectional view at the rear of the peck feed drill showing the interaction of the motor/cushion valve assembly as a part of the piston assembly and how it interacts with the pylon at the rear of the peck feed drill when the piston assembly is in the "home" position;

The following drawings are schematics of the pneumatic air logic control system of the peck feed drill of the present invention. Each schematic includes a legend describing the various operating parameters caused by the air flow shown in the schematic. Additionally, each schematic shows the position of the rotating drill bit relative to the workpiece and the position of the feed control mechanism. Where necessary for clarity, the position of the motor/cushion valve assembly is also shown.

Figure 8:
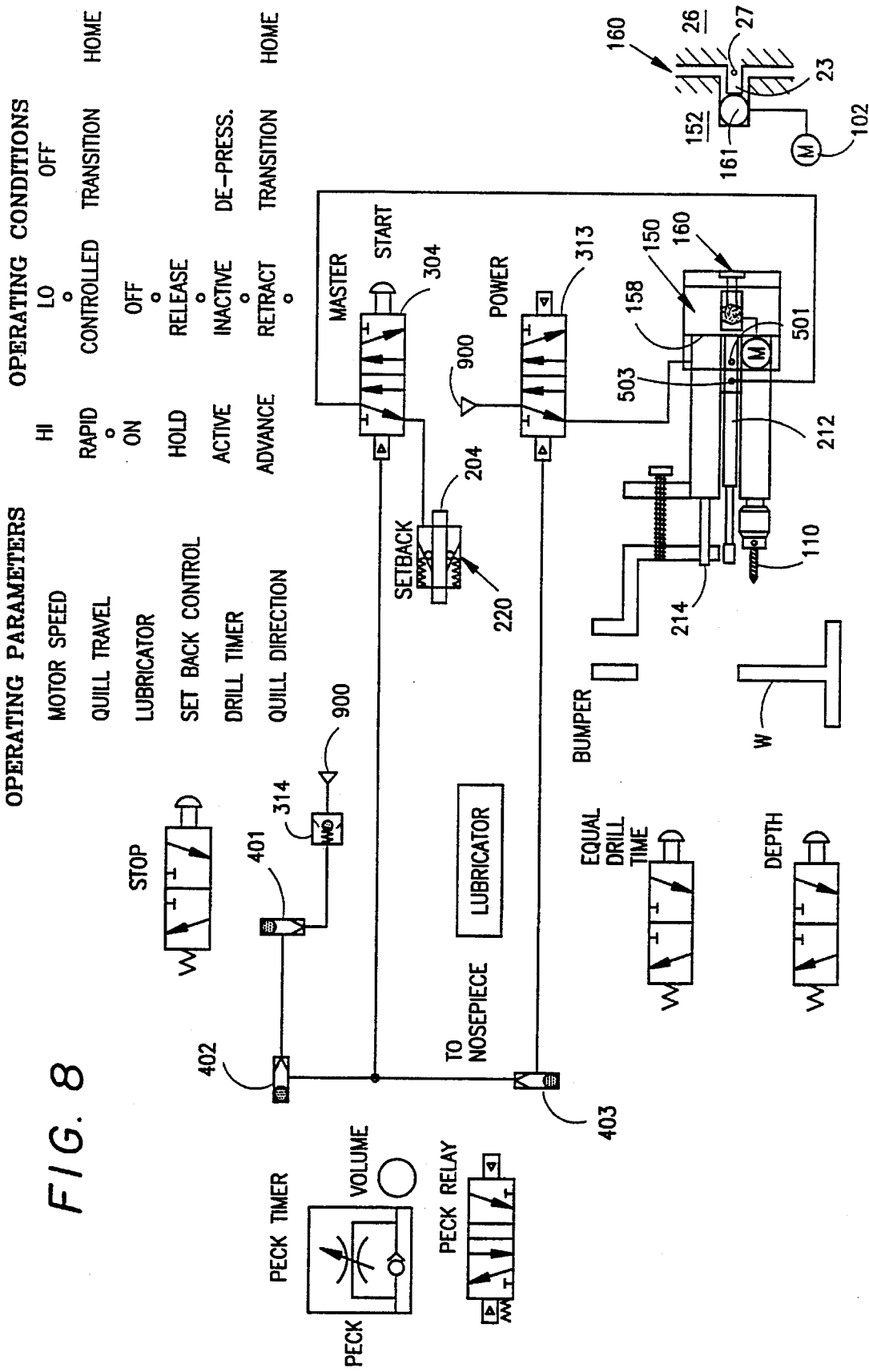
Figure 9:
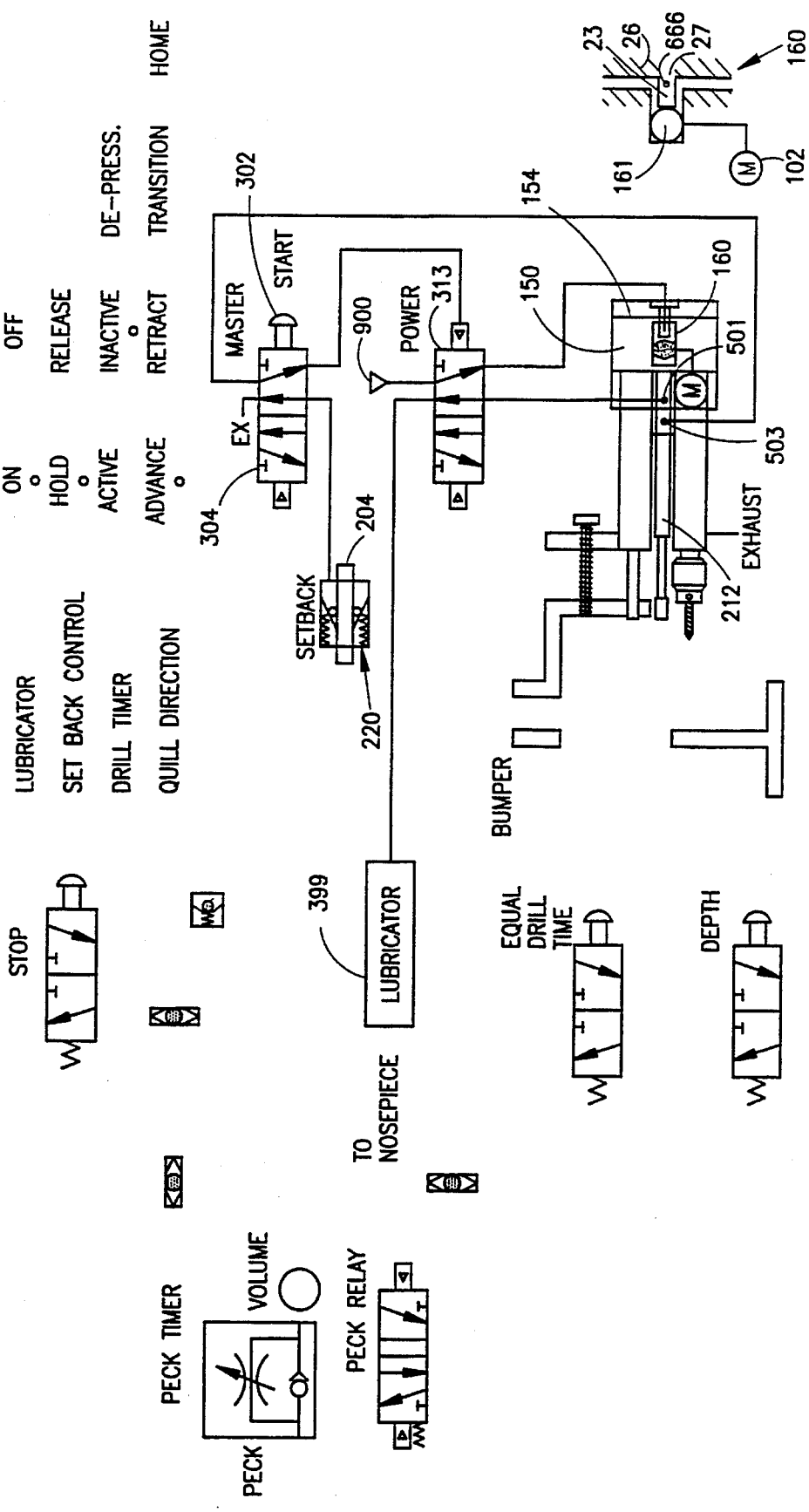
Figure 10:
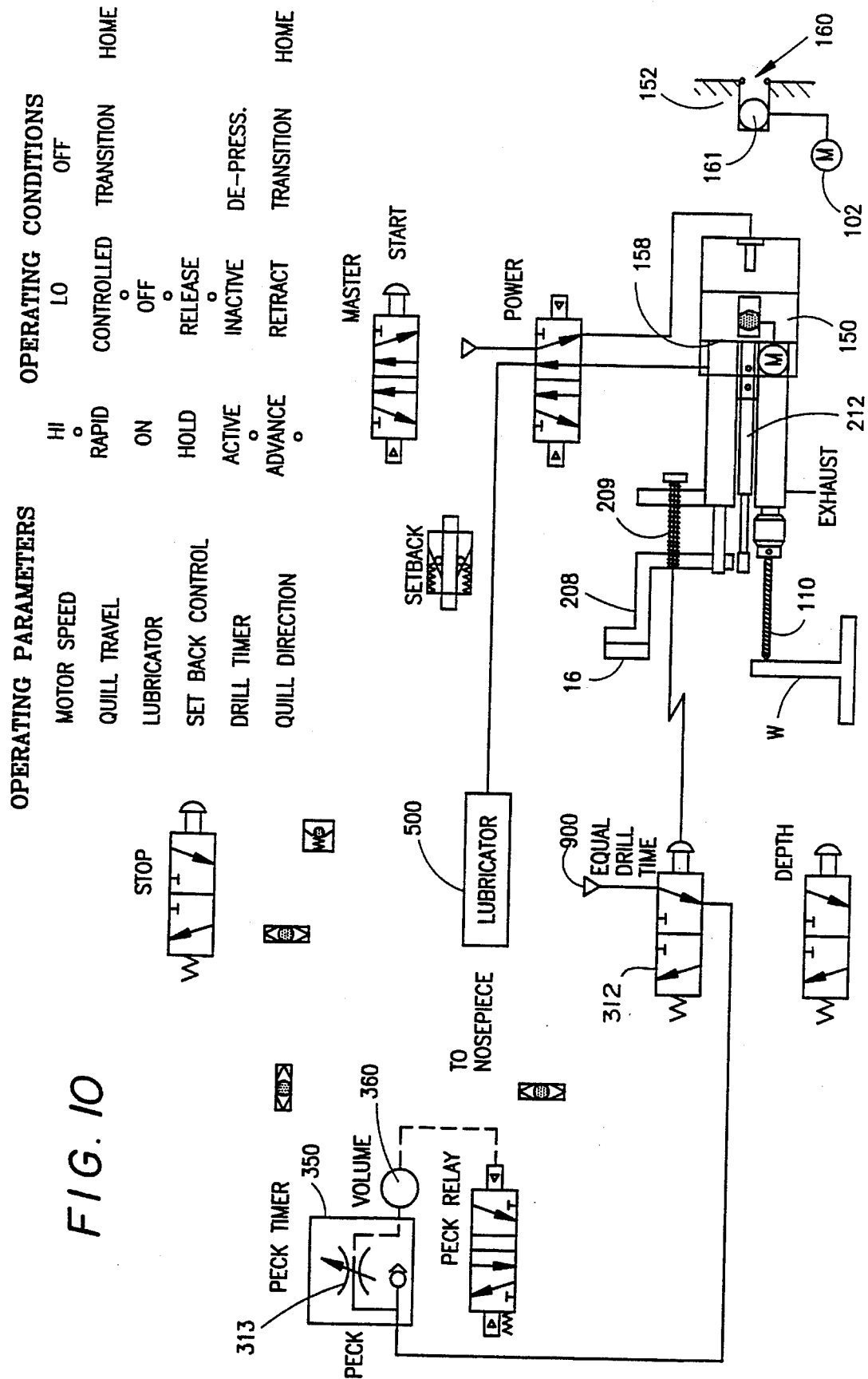
Figure 11:
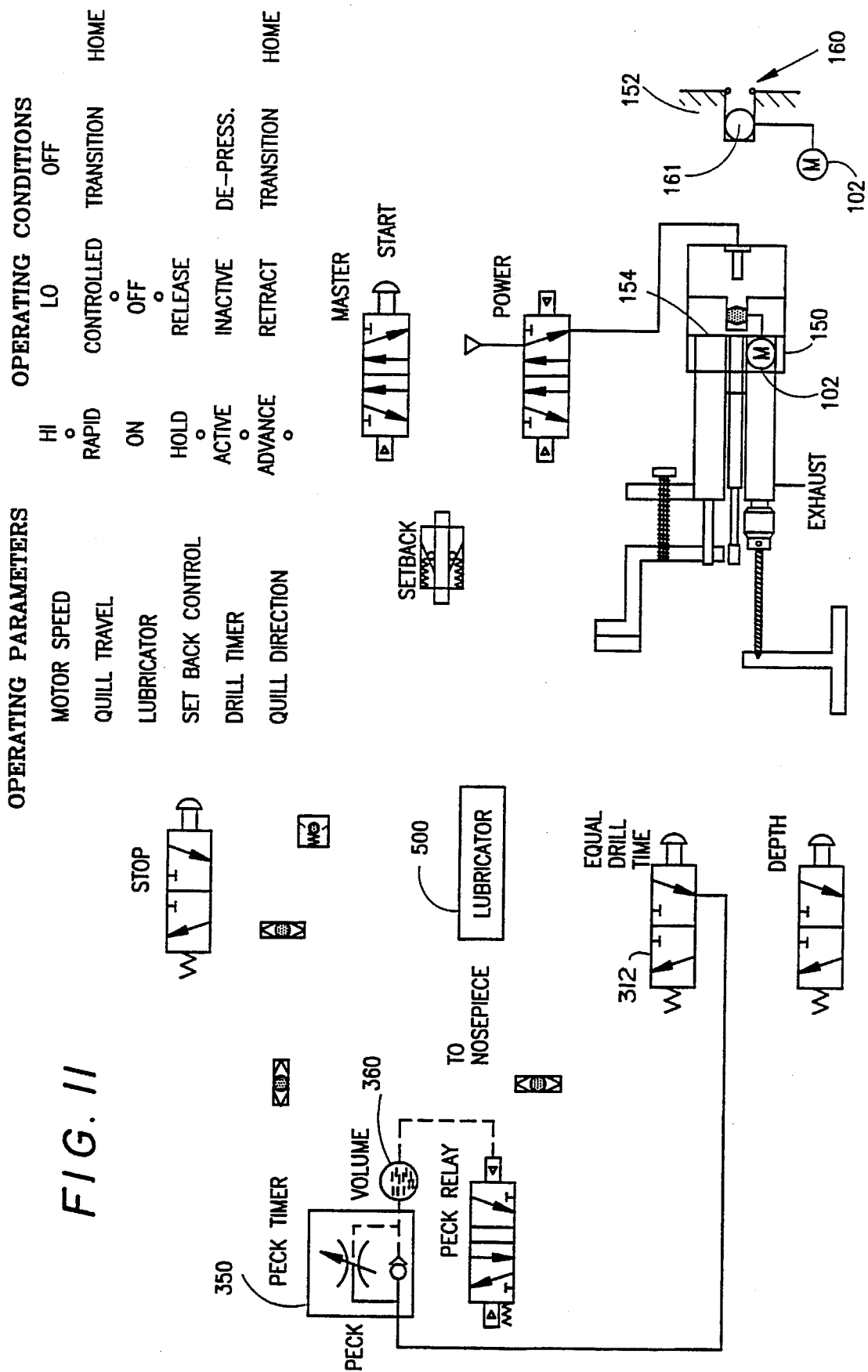
Figure 12:
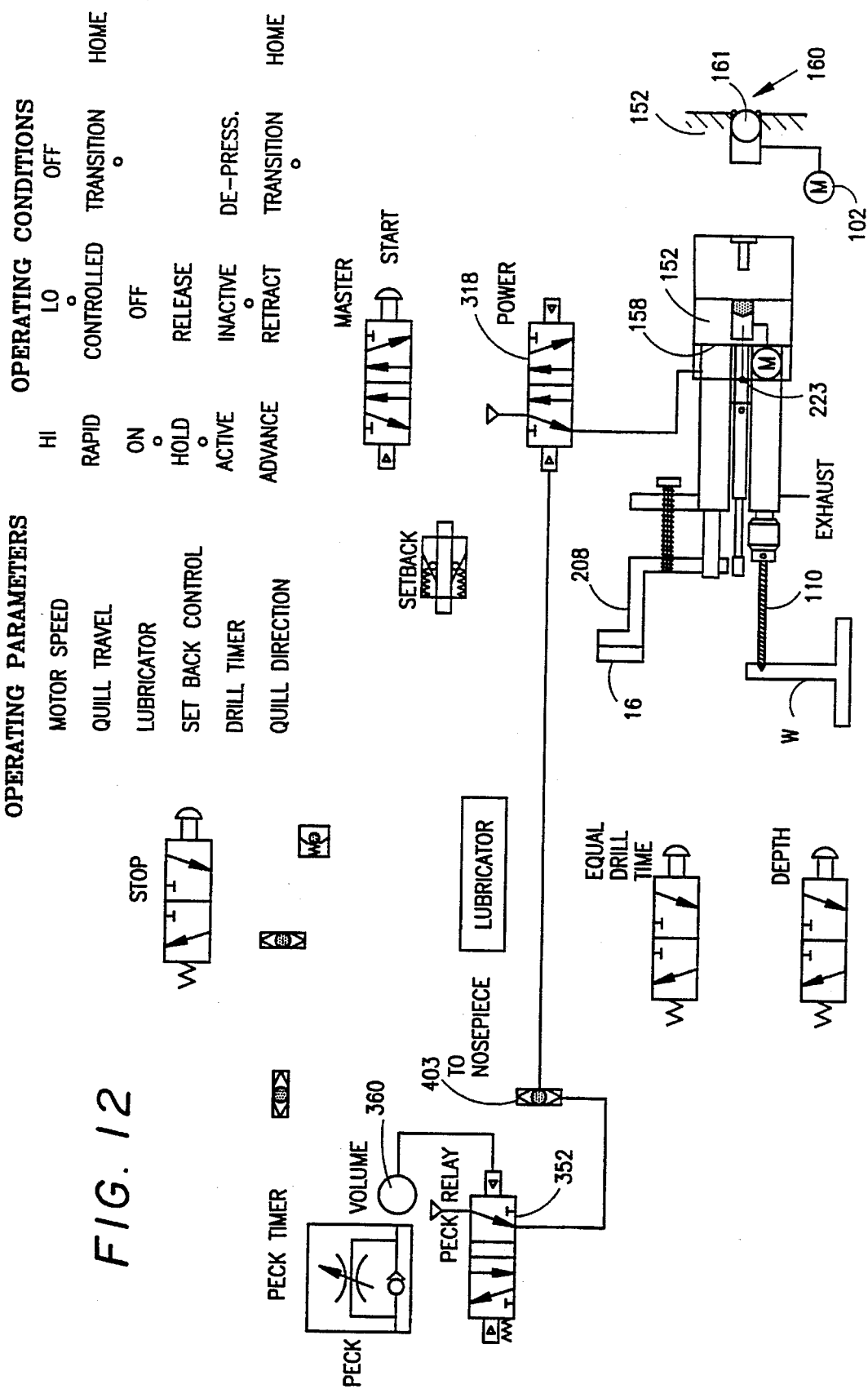
Figure 13:
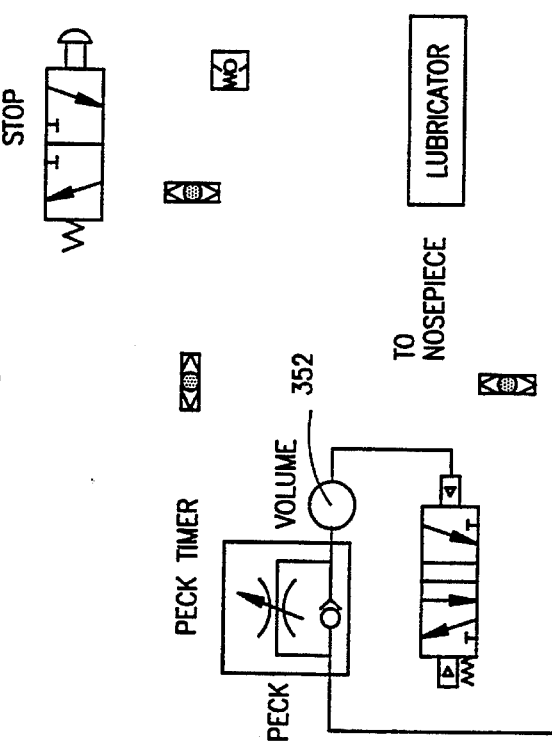
Figure 13:
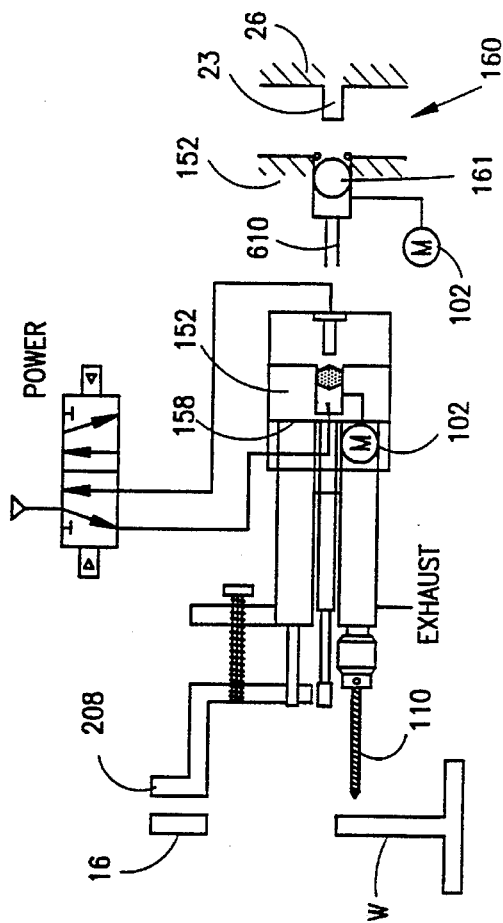
Figure 13:
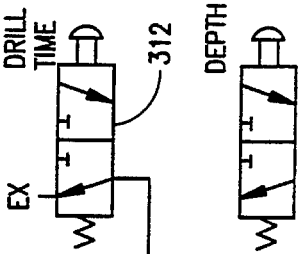
Figure 14:
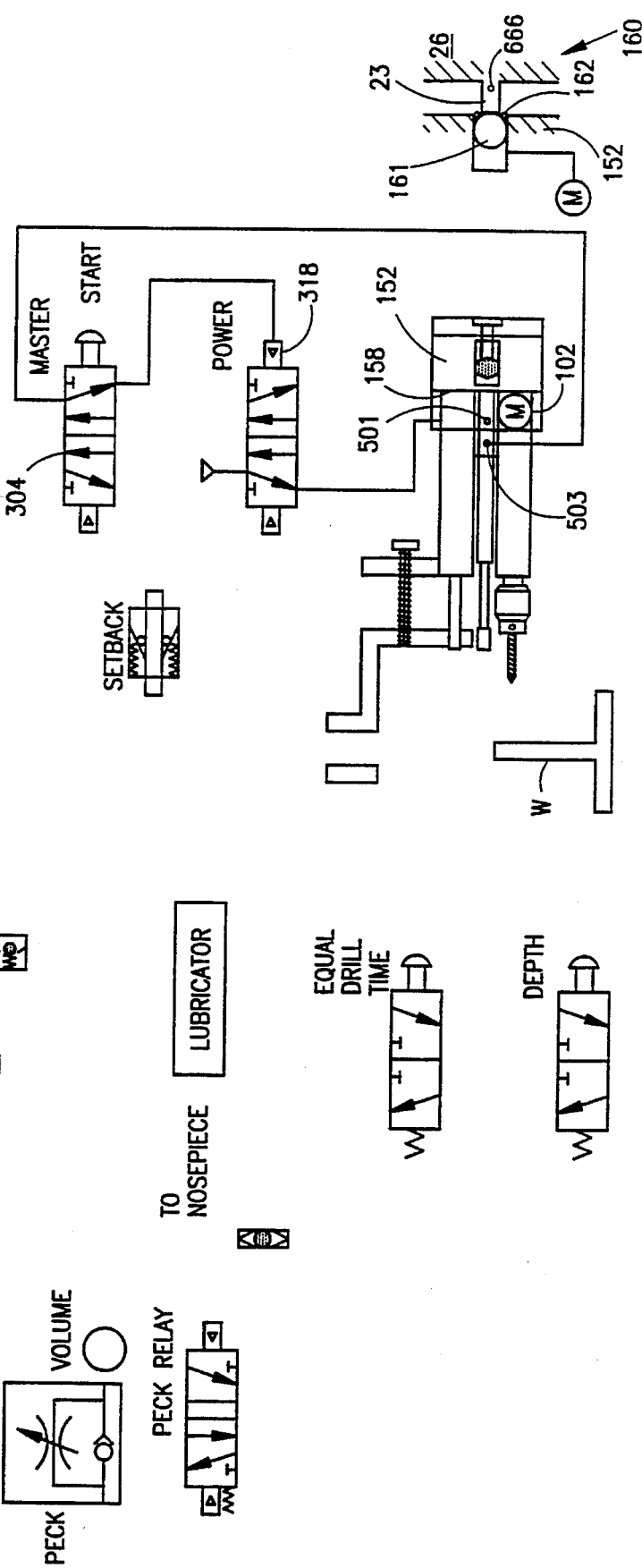
Figure 15:
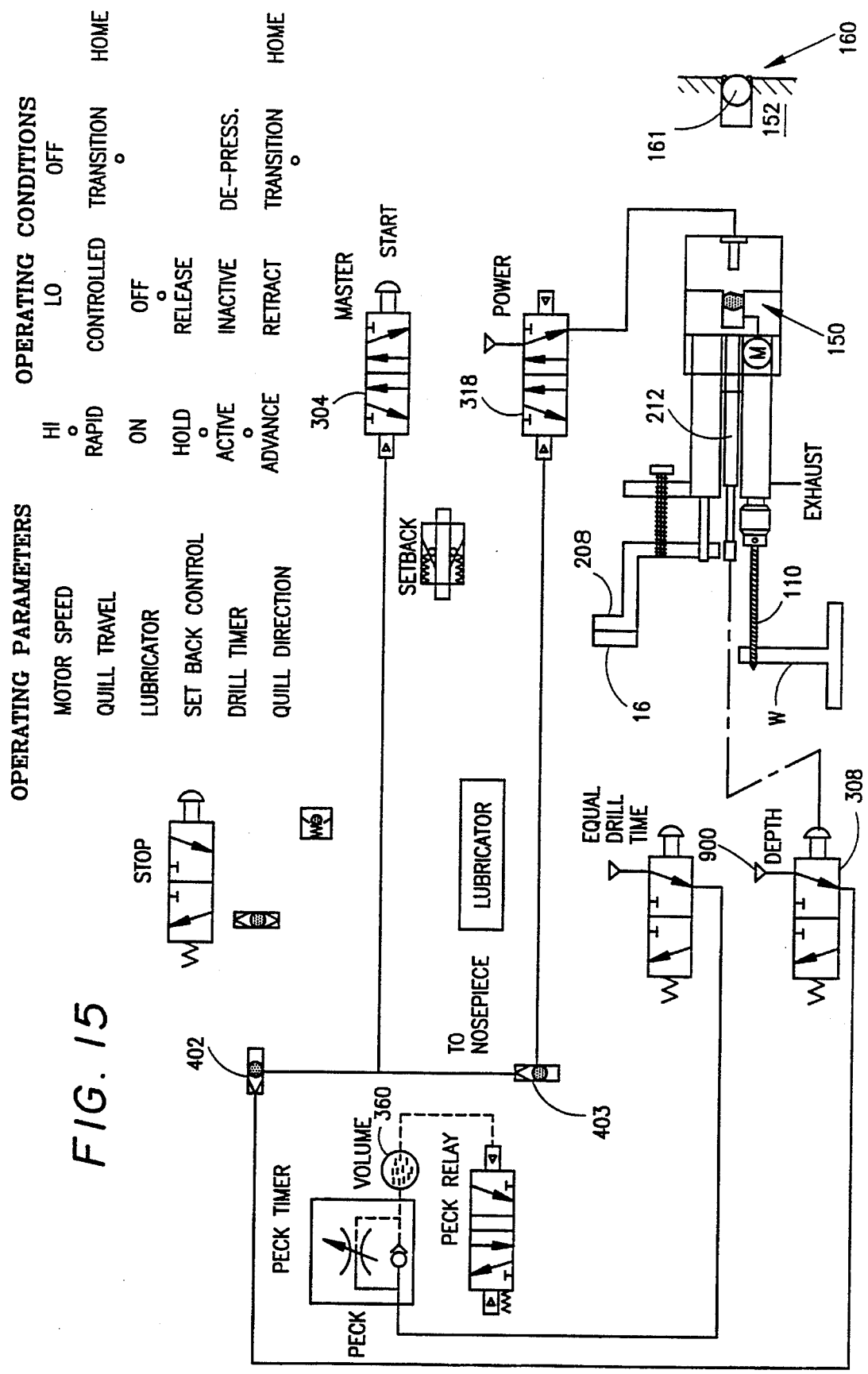
Figure 17:
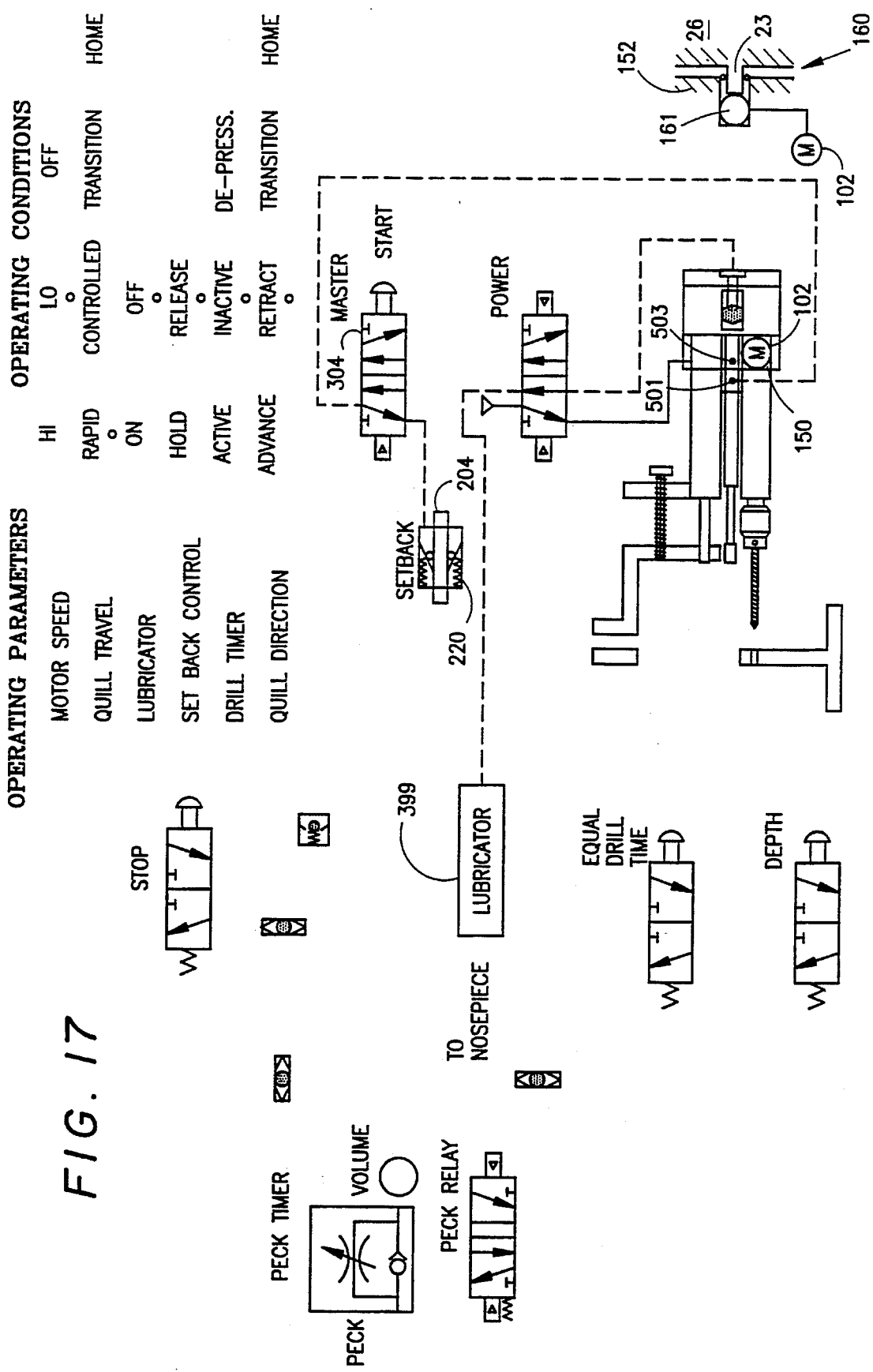
Figure 18:
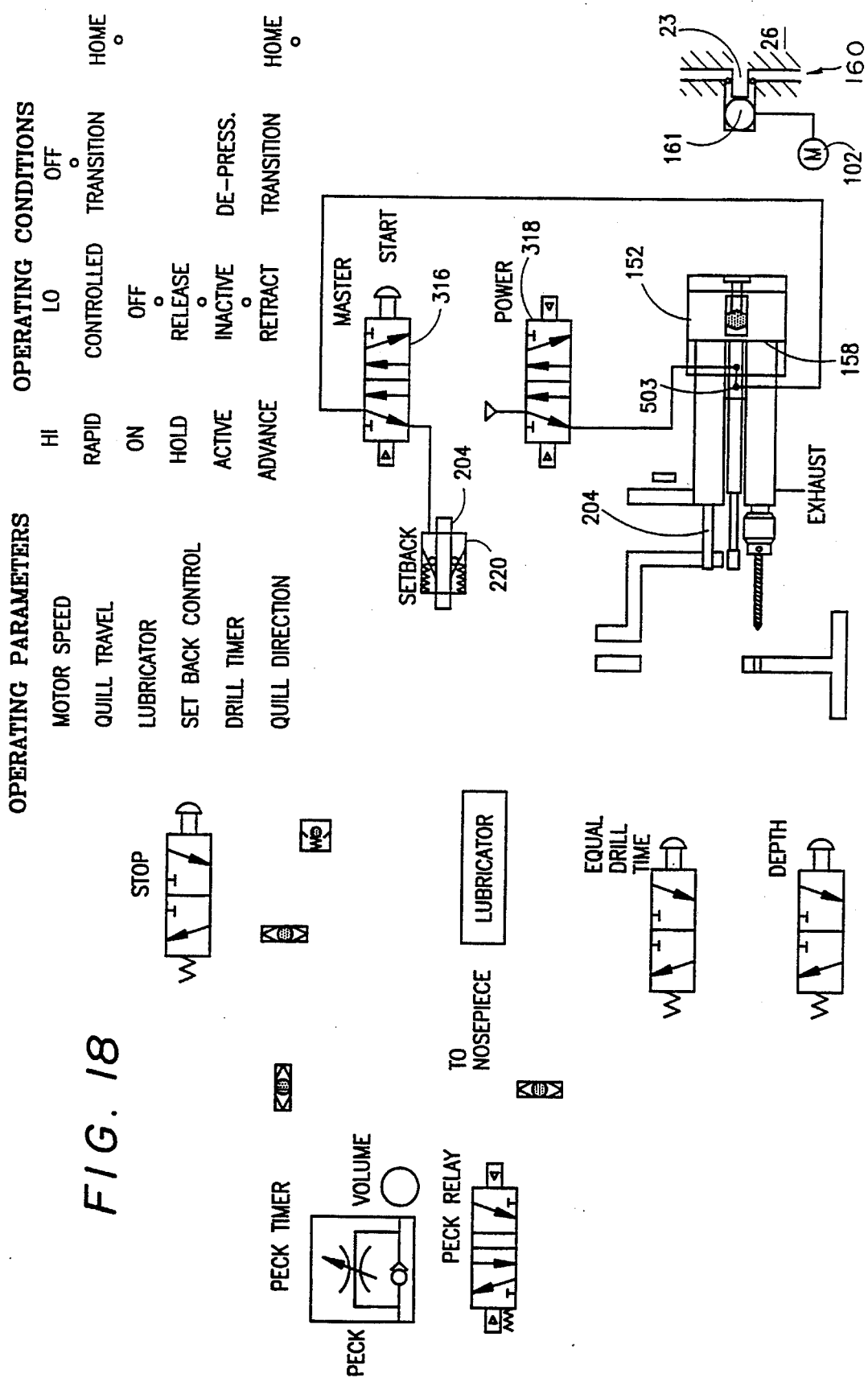
Figure 19:
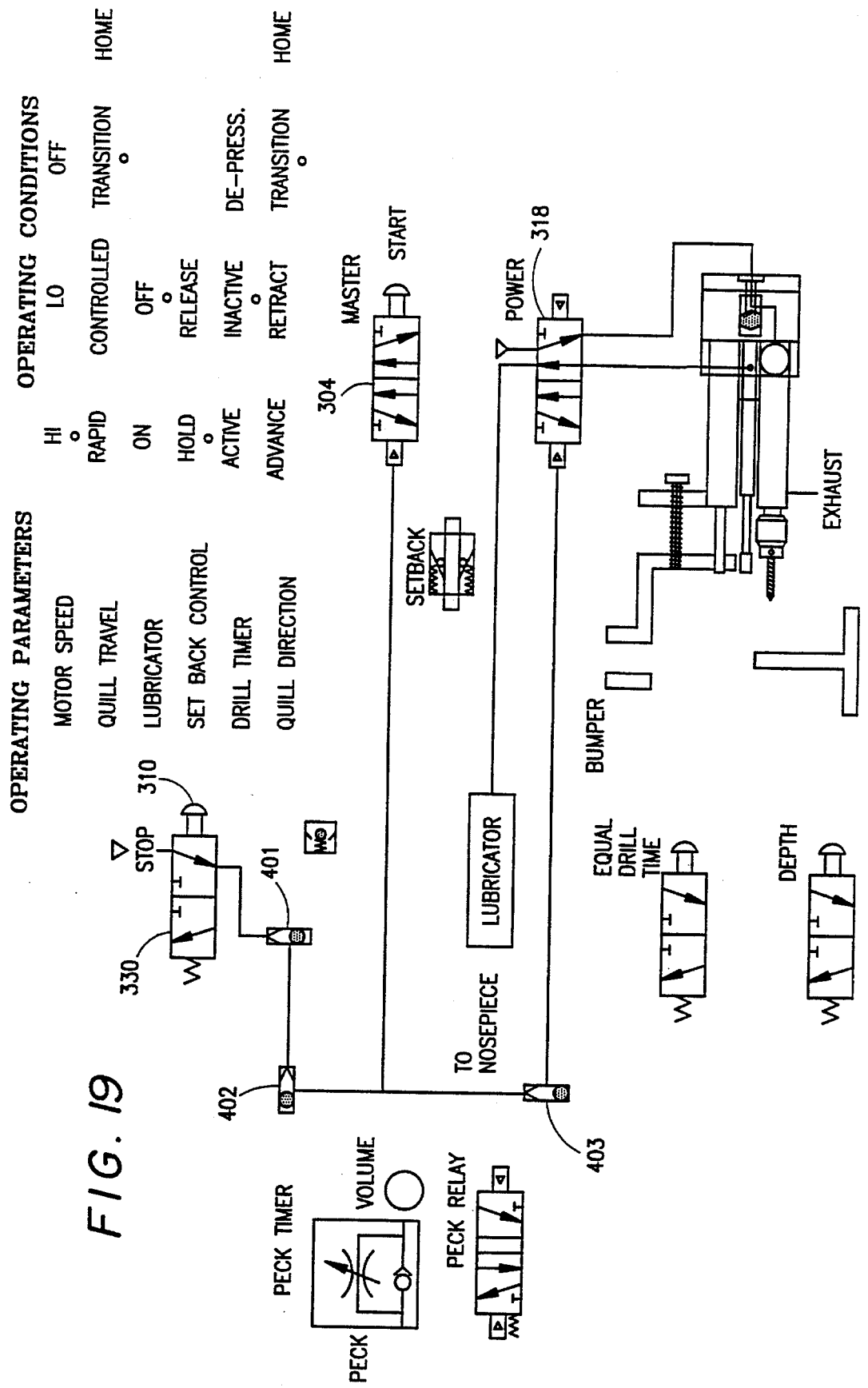

FIG. 8 illustrates flow in the pneumatic system shortly after the peck feed drill has been connected to a supply of high pressure air;

FIG. 9 illustrates flow in the pneumatic system just after the "start" button has been pushed;

FIG. 10 illustrates flow in the pneumatic system once rapid advance of the rotating drill bit has been completed and controlled feed has begun;

FIG. 11 illustrates flow in the pneumatic system during actual drilling under controlled feed;

FIG. 12 illustrates flow in the pneumatic system when the drilling cycle has been completed and the retraction of the rotating drill bit out of the workpiece has been initiated;

FIG. 13 illustrates flow in the pneumatic system while the retraction is in midstroke;

FIG. 14 illustrates flow in the pneumatic system when the retraction stroke has been completed;

FIG. 15 illustrates flow in the pneumatic system when the preset drill depth has been reached;

Figure 16:
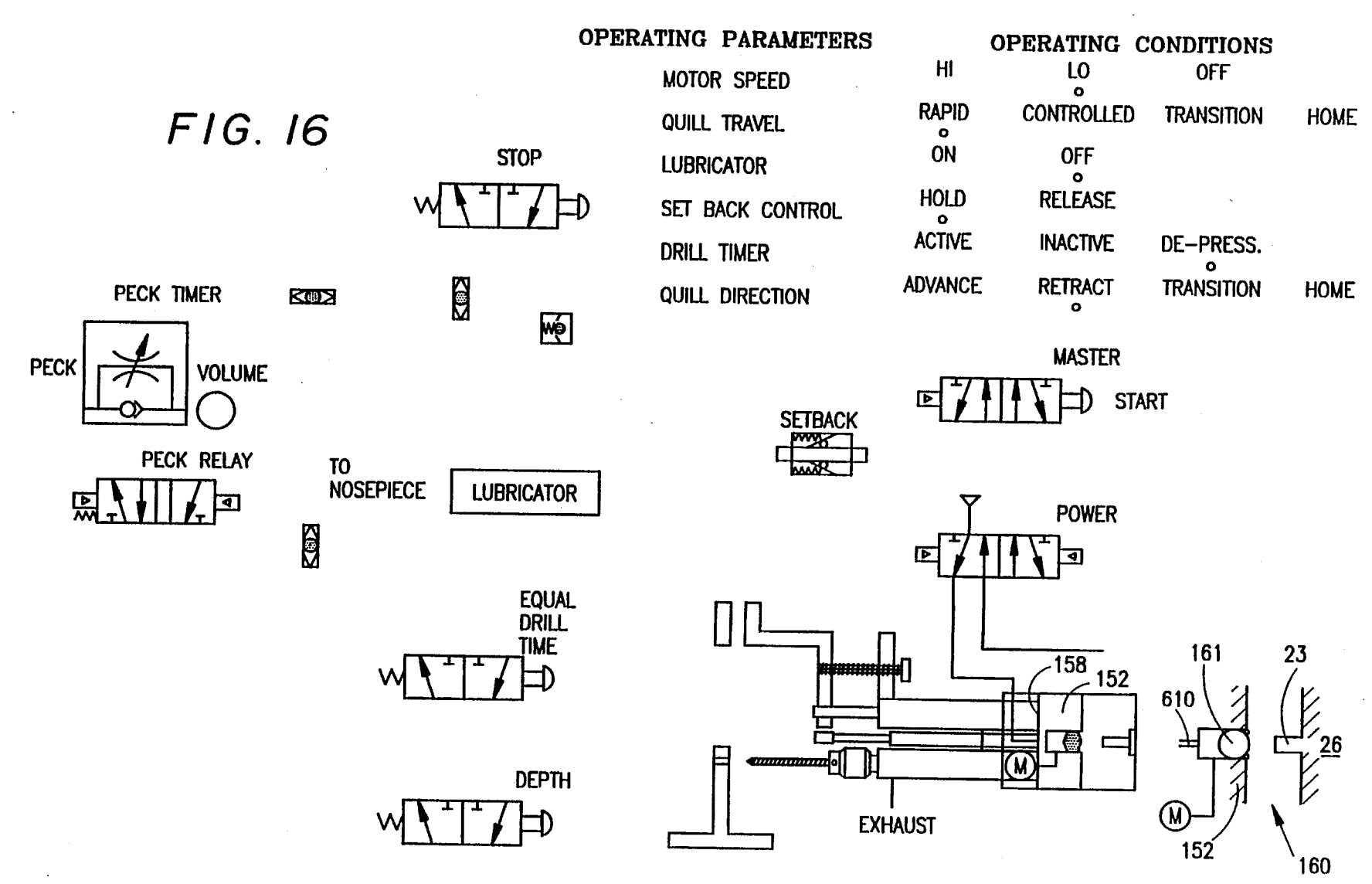

FIG. 16 illustrates flow in the pneumatic system after the preset drill depth has been reached and the retraction of the peck feed drill is in midstroke;

FIG. 17 illustrates flow in the pneumatic system after the preset drill depth has been reached and the retraction of the peck feed drill nears its end;

FIG. 18 illustrates flow in the pneumatic system after the preset drill depth has been reached and the retraction is complete; and FIG. 19 illustrates flow in the pneumatic system after the "stop" signal has been sent.

DESCRIPTION OF OPERATION AND CONSTRUCTION

General Tool Operation

Figure 1:
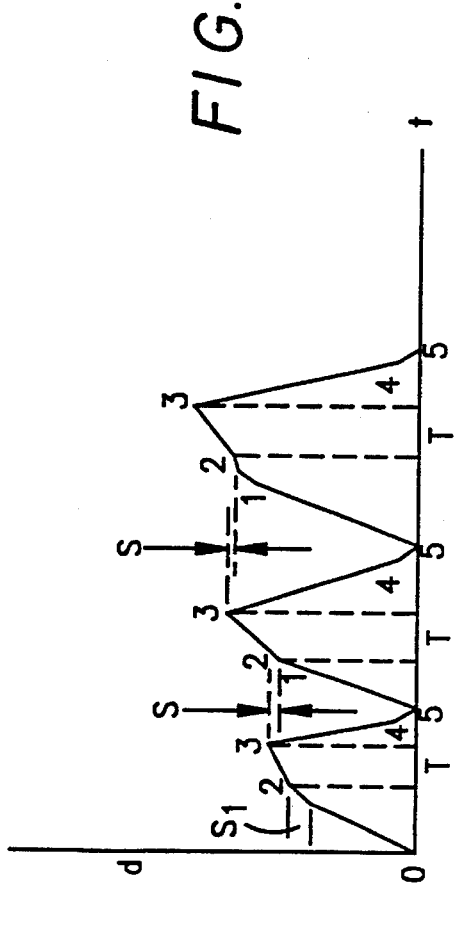
FIG. 1 is a time-distance graph showing the travel of the rotating drill bit of a typical peck feed drill.

In FIG. 1, a graphical representation of the travel of the tip of a rotating drill bit in a typical peck feed drill is given. Because the rotating drill bit is advanced into a workpiece and then retracted, the graph is a series of humps. Humps further to the right are higher as the travel of the peck feed drill increases as the hole being drilled gets deeper.

During each cycle or peck into the workpiece, the rotating drill bit travels a little further into the hole in the workpiece. Pecks are time controlled. Following passage of a preset drilling time "T", the rotating drill bit is retracted completely from the partially drilled hole. Drill and retraction, drill and retraction ... continues until the desired hole depth has been reached.

From point 0 to point 1, the rotating drill bit is rapidly advanced from its fully retracted or "home" position toward the workpiece. From point 1 to point 2, the speed of forward movement of the rotating drill bit toward the workpiece is significantly slowed. During this period the movement of the rotating drill bit is changed from rapid feed to a preset feed rate called controlled feed. Actual drilling takes place between points 2 and 3.

No drilling of the workpiece takes place just after the transition to controlled feed as the rotating drill bit is not in contact with the workpiece; rather, the tip of the rotating drill is just short of contacting the bottom of the partially drilled hole. This period of controlled feed prevents the rotating drill bit from slamming into the bottom of the hole and damaging the drill bit or the workpiece. This small distance between the beginning of controlled feed of the rotating drill bit toward the workpiece and actual contact of the rotating drill bit with workpiece has come to be known in the art as the "setback" distance. Graphically, this is shown as distance "S". Note that controlled feed begins just slightly behind where the previous drilling cycle left off.

From point 2 to point 3 actual drilling or removal of material from the bottom of the hole in the workpiece takes place. Actual advancement of the rotating drill bit into the workpiece is regulated by the feed control assembly, motor horsepower and thrust force. Note that for each drilling cycle time "T" is the same.

From point 3 to point 4 the peck feed drill rapid retracts back toward the "home" position as the rotating drill bit is completely removed from the partially drilled hole. From point 4 to 5 the retraction is cushioned as the drill nears the end of its retraction stroke at the "home" position.

Once a drilling cycle and retraction cycle have been completed, the advancement cycle begins again with a period of rapid advance followed by a period of controlled feed, then actual drilling of the workpiece under controlled feed for a pre-set period of time, rapid retraction and cushioning at the end of the retraction stroke.

Figure 2:
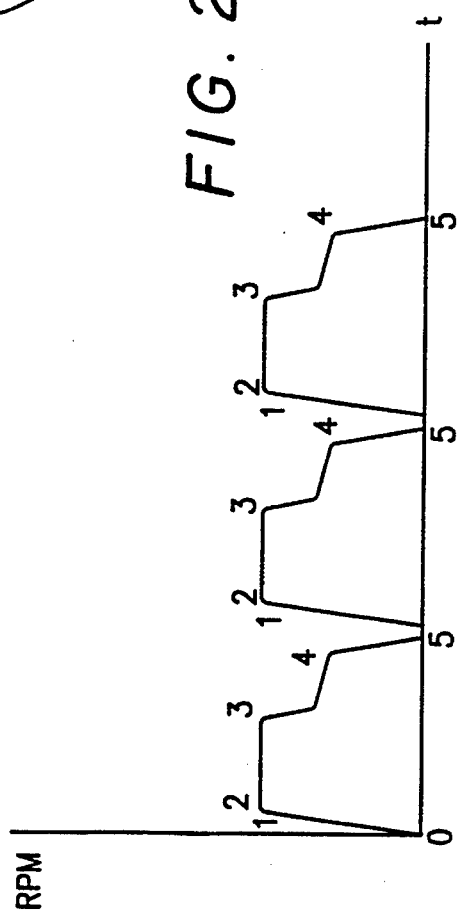
FIG. 2 is a time motor RPM graph during operation of the peck feed drill.

In FIG. 2, motor speed is compared to drill time. Note that the motor shifts from high speed to low speed depending on the position of the rotating drill bit. The numbered points on FIG. 2 correspond to the numbered points on FIG. 1.

General Construction

The pneumatic peck feed drill 10 of the present invention includes three main subsystems. The first subsystem is the motor quill assembly 100. The second subsystem is the feed control assembly 200 and the third subsystem is the air logic system 300 for beginning the peck drilling cycles, controlling actual drilling time, and stopping the drill when the required depth has been reached, or when a "stop" signal has been sent.

Motor Gear Quill Assembly

Figure 4:
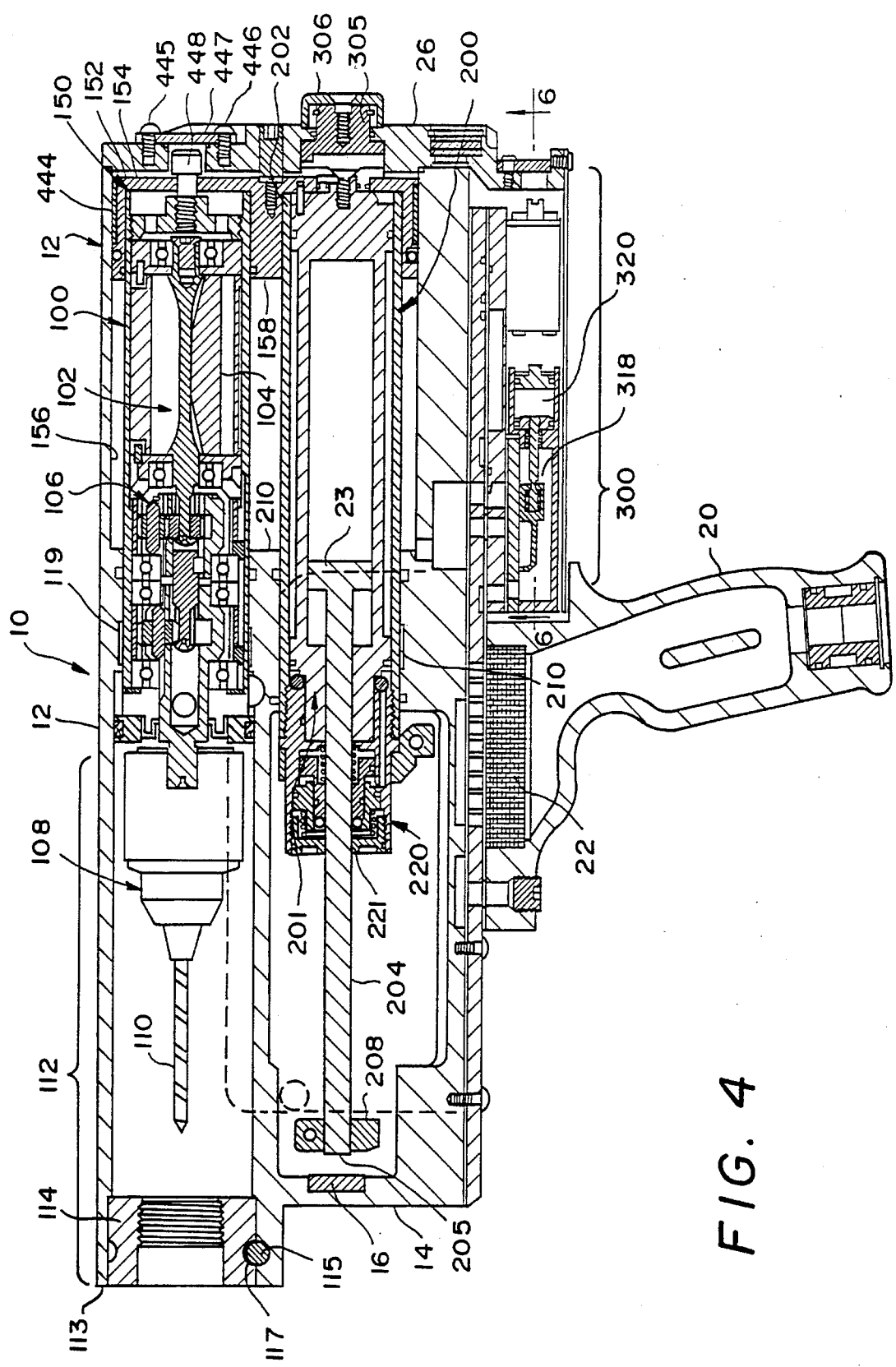
FIG. 4 is a sectional view of the peck feed drill of the present invention.

In FIG. 4 it may be seen that the motor gear quill assembly 100 consists of an air motor assembly 102 having a plurality of vanes 104. Attached to the front of the air motor 102 is a gear box assembly 106 which both reduces the rpm of the tool and raises the torque applied to the rotating drill bit 110 to desired levels. In front of the gear box 106 is a rotatable chuck assembly 108 which holds drill bit 110.

Feed Control Assembly

The feed control assembly 200 controls the rate of advance or feed of the rotating drill bit 110 into the workpiece. The heart of the feed control assembly 200 is a piston and cylinder assembly 201 to regulate the rate of advance of the rotating drill bit 110 toward the workpiece. The piston and cylinder assembly 201 operates by allowing a controlled flow of hydraulic fluid past an internal adjustable orifice to enable a controlled rate of travel of the internal piston 23 within cylinder 202. A piston rod 204 extends from piston 23 out of cylinder 202. Pressure against the end 205 of piston rod 204 acts to push the internal piston 23 through cylinder 202. The controlled rate of travel of the internal piston 23 through cylinder 202 is what is used to control the feed of the motor quill assembly 100 toward the workpiece. Such feed control piston assemblies have been described in U.S. Pat. No. 4,257,499.

It is important to the understanding of the peck feed drill 10 of the present invention to note that the motor gear quill assembly 100 and feed control assembly 200 move together as a single unit with piston 152. Motor gear quill assembly, feed control assembly and piston 152 form piston assembly 150.

Air Logic Circuit

Air logic circuit 300 controls the flow of air to: a) operate air motor 102, b) advance the piston assembly 150, and c) perform those other functions associated with peck feed drilling. Such other functions include controlling the drilling time, shutting down the peck feed drill when the preset hole depth has been reached, and initiating or stopping operation of the peck feed drill.

Tool Housing

A still better understanding of the air powered peck feed drill 10 of the present invention may be had by a description of its construction. Key components are contained within a housing 12. Housing 12 provides a path for piston assembly 150. In the peck feed drill of the present invention, housing 12 not only provides a path for piston assembly 150, but also provides the structural and torsional support for motor gear quill assembly 100. Without strong structural and torsional support the key feature of peck feed drills, accurately drilled straight and true holes, would be lost.

In front of that portion of housing 12 which contains motor gear quill assembly 100 is nosepiece portion 112. In prior art peck feed drills, nosepieces have had a variety of designs. Usually they are made to be interchangeable on the front of the housing. These interchangeable nosepieces have been used to attach peck feed drills to the drill bushing (not shown) through which the rotating drill bit passes on its way into the partially drilled hole. The drill bushing locks the tool to the fixture and guides the rotating drill bit into the workpiece.

Adaptor Plug

In the peck feed drill of the present invention 10, an adaptor plug 114 is placed in the end 113 of the nosepiece portion 112 of housing 12 to accommodate a variety of different drill bushings. Consequently, the need to have a variety of nosepieces available to interchange on the front of the peck feed drill has been eliminated. Various sizes of drill bushings may be used by changing adaptor plug 114.

Adaptor plug 114 is held in place by bolt 115. Bolt 115 secures adaptor 114 to housing 12. Adaptor 114 contains a plurality of channels 117, any of which will accept bolt 115. Accordingly, adaptor plug 114 may be removed from end 113 of housing 12 and indexed around to as many different positions within end 113 as there are channels 117. This indexing is important as the position of the housing 12 of peck feed drill 10 is governed by how the drill bushing is attached the drilling fixture which is mounted on the workpiece.

When the adaptor plug 114 has been indexed to the proper position, bolt 115 is slid through that channel 117 nearest the desired position. If bolt 115 comes loose, the operator will experience vibrational movement of the peck feed drill 10 with respect to the workpiece. Adaptor plug 114 may become loose, but will not dislodged from housing 12 as bolt 115 remains in channel 117. The loosening of bolt 115 allows flexing of the peck feed drill in relation to the mounting fixture. Such fixture will be visible to the operator. If such fixture is observed, the operator can immediately shut down the peck feed drill 10 to assure that the adaptor plug 114 is firmly secured in end 113 of housing 12. Accordingly, there is a visual and tactile indication of a need for mechanical adjustment of the peck feed drill 10 before imperfect holes are drilled.

A closer look at adaptor plug 114 will reveal that it accomplishes three things. First, it allows for a quick matching of drill bushings with peck feed drill 10. In prior art drills, it was necessary to change the entire nosepiece. In the peck feed drill 10 of the present invention, it is merely necessary to remove bolt 115 and slide adaptor plug 114 out of the housing 12.

Secondly, on prior art peck feed drills, it may be necessary to mount an indexing assembly between the front of the drill and the nosepiece. This indexing assembly assures that the peck feed drill with the drill bushing mounted thereon can be tightly attached to the drilling fixture in a variety of positions.

In the peck feed drill of the present invention, there is no need for a multi-position indexing connector as adaptor plug 114 may be installed within tool housing 12 in a variety of positions.

Adaptor plug 114 also provides for placing lubricant on rotating drill bit 110.

Because adaptor plug 114 is such a simple piece, it may be permanently mated with frequently used drill bushings. On prior art drills, it was necessary to disassemble drill bushings from nosepieces. The relatively high cost of nosepieces prevented amassing a collection of nosepieces. Such disassembly of drill bushings from nosepieces was usually difficult because of the high torques used to thread drill bushings into nosepieces. These high torques have resulted in breakage of prior art peck feed drills when the drill bushings were removed. This problem is solved by the adaptor plug 114 of the present invention.

Piston Assembly

In prior art air powered peck feed drills, the motor gear quill assembly has been stabilized by mounting it on several bearings or within a tube. Torque developed while drilling had to be absorbed by a torque reaction arm or bracket. Prior art feed control assemblies have been kept separate from motor gear quills and usually retained in a stationary position. In the air powered peck feed drill 10 of the present invention, the feed control assembly 200 extends from piston assembly 150 and actually travels back and forth along with the motor gear quill assembly 100 as the motor gear quill assembly 100 is either retracted or advanced toward the workpiece.

Figure 3:
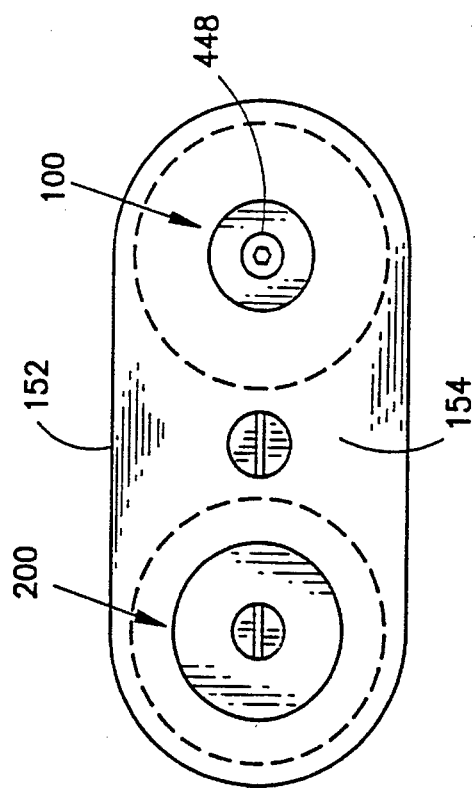
FIG. 3 is a rear view of the racetrack shaped piston used in the peck feed drill of the present invention.

As previously stated, there are two moving assemblies in the air powered peck feed drill of the present invention 10; the feed control assembly 200 and the motor gear quill assembly 100. These two assemblies travel together as a unit (piston assembly 150) as they are attached to a single piston 152. A rear view of piston 152 is shown in FIG. 3. Air pressure is applied on the rear or thrust face 154 of piston 152 to advance both the motor gear quill assembly 100 and the feed control quill assembly 200. Piston 152 contains bearing 444 which is used for support and guidance of assemblies 100 and 200 within housing 12 and also acts to absorb torque developed during actual drilling.

The use of piston 152 as a motor gear quill stabilization bearing support enables shortening the overall length of peck feed drill 10. Because of the unique arrangement and shape of piston 152, there is only a need for a single front bearing 119. Rear support for the entire piston assembly 150 is provided by the surface interaction of piston bearing 444 against the inside surface 156 of housing 12.

The width of piston 152 and its shape, a race track shape (FIG. 3) having circular portions on either end and a parallel surfaces on either side, all work together to stabilize moving assemblies 100 and 200. The use of a race track design makes the most effective use of both the piston area and piston width in a small package. Reaction torque is absorbed by the interaction of race track shaped piston 152 with housing 12. TEFLON strip 444 is wrapped around the perimeter of piston 152 to facilitate its movement through housing 12. Consequently, those additional components used in prior art drills to absorb reaction torque have been eliminated.

The substantial length of parallel sides 151 of piston 152 enables countering of torsional reaction forces caused by drilling torque. Because the feed control assembly 200 is located off the center line of the motor gear quill 100, piston 152 also absorbs moment forces generated by drill torque.

Setback Operation

Controlled feed is shown between points 2 and 3 on FIG. 1. The initial portion of controlled feed, about 0.02 inch, is called the setback distance. This distance is added to the length of each peck so that the drill does not return exactly to the point where it left off. Rather the end of rotating drill bit 110 returns to a point farther in the partially completed hole than where it began the previous drilling cycle, but just short of where it ended the previous drilling cycle. Setback control assemblies which enable the precise positioning of the rotating drill bit are described in U.S. Pat. No. 4,961,675 to the same assignee.

Setback control assembly 220 is attached to the end of cylinder 202 of the feed control assembly 200. Currently, it moves as part of piston assembly 150. During operation of the peck feed drill 10, piston rod 204 is grabbed by setback control assembly 220 as piston assembly 150 is retracting. If peck feed drill 10 were to operate without having setback control assembly 220 to grab piston rod 204, piston rod 204 would extend fully out of cylinder 202 each time piston assembly 150 retracted to the "home" position. After the drill reversed direction and began moving back toward the workpiece, it would be necessary to push rod 204 all the way back into cylinder 202. Because rod 204 only can move at a slow controlled feed, valuable cycle time would be lost. To prevent this from happening and to facilitate rapid movement of the pecking mechanism when there is no need for controlled feed, setback control assembly 220 grabs piston rod 204 shortly after piston assembly 150 begins its retraction cycle. During retraction and re-advancement of piston 150, setback control assembly 220 grabs piston rod 204. When controlled feed begins, setback assembly 220 releases piston rod 204.

When the rotating drill bit 110 advances toward the workpiece, the rapid travel occurs until bracket 208 hits bumper 16. The setback distance of approximately 0.02" is automatically subtracted from the travel distance position memory provided by setback assembly 220 of feed control assembly 200. Setback distance is adjusted directly on setback control assembly 220. Accordingly, slower controlled feed begins just before rotating drill bit 110 contacts the bottom of the hole in the workpiece. From the "home" position to the beginning of controlled feed, assemblies 100 and 200 travel at full speed toward the workpiece. Using the slower controlled feed rate only when necessary reduces the time required to drill a hole.

Feed Control Assembly

In many prior art peck feed drills the feed control assembly 200 is oriented opposite to the direction of drill travel so that the force against the end 205 of the piston rod 204 is caused by contact with reaction components advancing with motor quill assembly 100 toward the workpiece. In the tool of the present invention base 203 of cylinder 202 is connected to piston 152. Using this arrangement, bracket 208, which is attached to moving piston rod 204, contacts housing 12. Additionally, in many prior art air feed peck drills, cylinder 202 is kept stationary and a member connected to the piston or the motor gear quill contacts the end of the piston rod to initiate controlled feed. The key to allowing movement of the feed control quill assembly 200 is the use of the race track shaped piston 152 in piston assembly 150 and having the piston 152 act as the rear bearing for both the motor gear quill assembly 100 and the feed control assembly 200.

Figure 5:
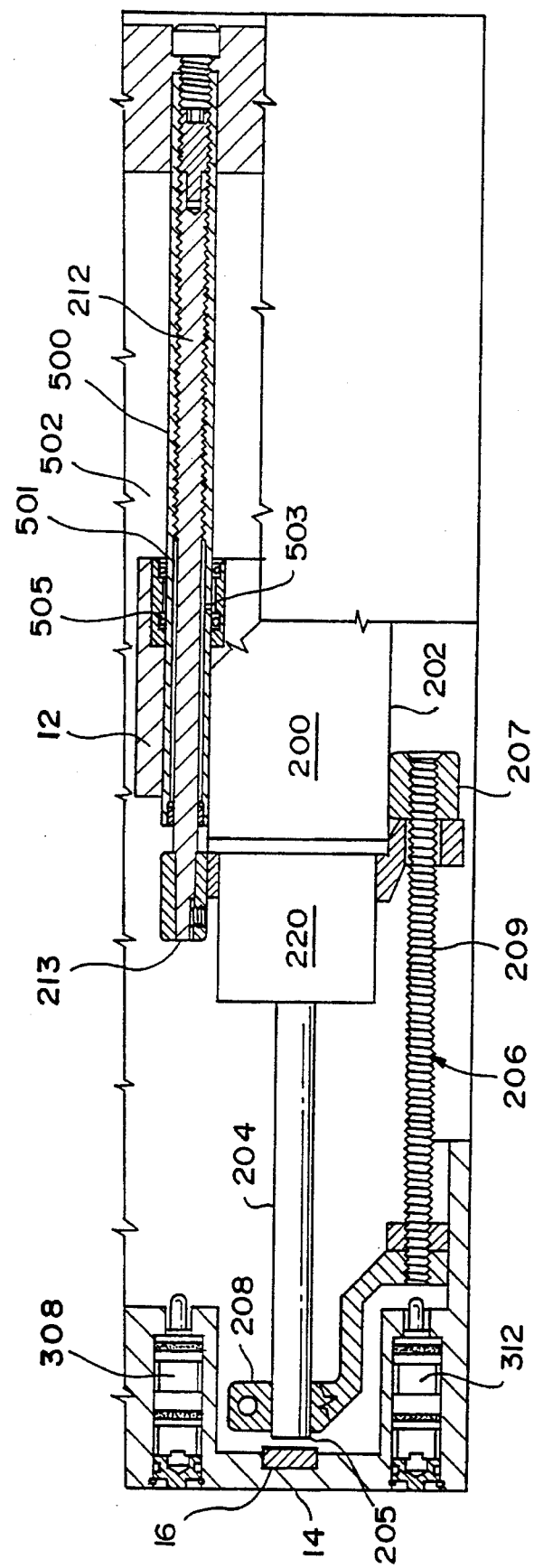
FIG. 5 is a sectional view of the peck feed drill showing the end of the piston rod that extends from the feed control assembly along with the depth adjustment and rapid advance adjustment mechanisms.

The combined motor gear quill assembly 100 and feed control assembly 200 advance as piston assembly 150 until rapid advance bracket 208 contacts the forward end 14 of housing 12. Cushioning this contact of bracket 208 with housing 12 is bumper 16 (see FIGS. 4 and 5).

Whenever rapid advance bracket 208 hits bumper 16, the movement of motor gear quill assembly 100 toward the workpiece is slowed to a controlled rate. As shown in FIG. 1, this controlled feed of motor gear quill assembly 100 occurs between points 1 and 2 (not drilling), and points 2 and 3 (drilling) on the time distance graph. The velocity of rotating drill bit 110 under controlled feed which begins before the rotating drill bit 110 hits the bottom of the hole in the workpiece is significantly slower than the velocity of the rotating drill bit 110 under rapid advance and rapid retract modes.

Once rapid advance bracket 208 hits bumper 16, all the forces generated by piston 152 are placed on piston rod 204, thus causing piston assembly 150 to enter controlled feed before the rotating drill bit 110 actually comes into contact with the bottom of the hole. Therefore, any distortion or movement of parts within the peck feed drill 10 takes place before contact of rotating drill bit 110 with the bottom of the partially drilled hole in the workpiece. In some prior art peck feed drills, the distortion or movement of parts was visually apparent to the user when the drill transitioned to controlled feed. Despite the fact that hole quality was not affected, this visual movement of the tool remained disconcerting to many users. The configuration of the peck feed drill 10 of the present invention greatly reduces the amount of pre-drilling visual distortion.

Pre-loading of the peck feed drill structure prior to drilling is particularly important as the purpose of peck feed drilling is to assure the drilling of an accurate, true, smooth hole. It is also very important to enter controlled feed prior to drill bit 110 coming into contact with the bottom of the hole. If the forces acting on piston 152 were first transmitted to the workpiece by contact of the rotating drill bit 110 with the bottom of the hole being drilled, the distortion and movement of the various parts within the drill 10 and of the fixture and workpiece would cause an inaccurate hole. It could also cause physical damage to drill bit 110, the workpiece and the fixturing. Accordingly, it is necessary to assure those forces generated within the drill 10 which cause movement, distortion or breakage of parts be placed on piston rod 204 before the rotating drill bit 110 engages the bottom of the hole in the workpiece.

Shortly after the beginning of controlled feed of the rotating drill bit 110, actual drilling, that is, the removal of metal from within the hole in the workpiece, begins. This period is shown between points 3 and 4 on the time distance diagram in FIG. 1. Actual drilling intervals are controlled only by drilling time. Drilling time is measured and controlled by a peck timer circuit assembly 350 in the air logic circuit assembly 300.

Adjustments

Six adjustments can be made to peck feed drill 10. Controlled feed rate is regulated by adjustment of the travel of piston rod 204 via adjustment knob 305. Setback distance is adjusted directly at point 221 on setback control assembly 220. Rapid advance distance is adjusted by turning knob 207. Drilling depth is set by turning rod 212.

As previously explained, radial positioning of peck feed drill 10 with respect to the workpiece is subject to the position of the adaptor plug 114 with respect to the nosepiece portion 112 of the housing 12. As will be explained below, peck timing is set by adjustment of valve 312.

Rapid Advance Adjustment

Both the motor gear quill assembly 100 and feed control assembly 200 move relative to housing 12. Piston rod 204 and the rapid advance adjustment assembly 206 (FIG. 5) also move relative to cylinder 202 of feed control assembly 200. In the peck feed drill of the present invention, piston rod 204 has a rapid advance bracket 208 attached at its outboard end 205. Attached to the rapid advance bracket 208 is a long threaded rod 209 which, along with adjustment knob 207, comprises rapid advance adjustment assembly 206.

The rapid advance distance travelled by piston assembly 150 is controlled by turning knob 207. Knob 207 changes the effective length of threaded rod 209. This adjustment controls the size of the gap between the end of piston rod 204 and bumper 16 in housing 12. Making the gap smaller reduces the amount of rapid advance of piston assembly 150 while increasing the size gap increases the amount of rapid advance of piston assembly 150. In peck feed drill 10, rapid advance stroke is adjustable from 0 to 3 inches or full stroke.

Drilling Depth Adjustment

Drill depth control rod 212 allows adjustment of drill depth from 0 to 3 inches. Manual length adjustment of rod 212 allows its end 213 to contact depth control valve 308. Contact with valve 308 causes a signal to be sent which returns the unit to the "home" position. This shuts down operation of peck feed drill 10 when the preset drill depth has been reached.

As will be explained in the description of the schematic drawings, depth adjustment sleeve 500 also acts as a valve. When hole 501 is in communication with chamber 502, pressurized air passes to hole 503 and then via housing 12 back to air logic circuitry 300. Whenever the motor gear quill 100 moves to its fully retracted position, there is an air pressure signal from the pressure on the retract or front side of piston 152 through depth control rod 212 and back to air logic circuitry 300.

Controlled Feed Adjustment

Control of the advancing speed of the piston assembly 150 while under controlled feed is accomplished by turning adjustment 305 (FIG. 4). To assure that adjustment 305 is not tampered with, adjustment 305 is protected by a small cover 306. A vernier scale is used as a reference to adjust the speed at which peck feed drill 10 advances while under controlled feed. This adjustment varies the amount of the controlled flow of hydraulic fluid around the internal piston in cylinder 202 of the feed control assembly 200.

Drilling cycles in and out of the workpiece will continue until a depth signal is sent from valve 308 or a stop signal is sent by depressing button 310. As the hole gets deeper in the workpiece, the pecks get longer as the tool must travel a greater distance between home and the beginning of controlled feed. Accordingly, the number of pecks per second of the tool reduces in number because of the greater distance that the quill assembly must travel between each peck. Peck time must be distinguished from drill time because valve 312 which starts the timing circuit only under controlled feed assures equal drill time for each peck.

Disassembly and Service

Disassembly of peck feed drill 10 is made easy because of its modular design. The entire motor gear quill assembly 100 package may be removed from housing 12 as a unit. This is accomplished by first removing adaptor plug 114, then loosening screws 445 and 446 and rotating plate 447 to gain access to motor screw 448. Motor screw 448 and bit 110 are then removed. By locking a long rod (not shown) in chuck 108, the motor gear quill assembly can now be pulled out of housing 12. A reduced diameter at the leading edge of quill assembly 100 facilitate the passage of the motor gear quill assembly 100 over seals 111 within housing 12.

Service of the feed control assembly 200 is accomplished by removing back cap 26 after motor gear quill assembly 100 has been removed from housing 12. Feed control assembly 200 is removed as a unit from the rear of drill 10. As no separate internal hose connections are used to provide air signals to the setback assembly 220 (use and operation explained above), disassembly and subsequent re-assembly are easily achieved. Separate hose assemblies to supply air to setback assembly 220 are found in the prior art. In the drill 10 of the present invention, the air flow signaling setback control assembly 220 to release its grip on piston rod 204 is provided to the setback assembly 220 within housing 12.

Air Flow-General

Air enters peck feed drill 10 through the bottom of handle 20. The air then passes through a wet foam mesh filter 22 and enters both operating systems 100 and 200 and air logic circuit 300 (FIG. 6). Pulse valve 314 in logic circuit 300 then causes peck feed drill 10 to move to the rear of its stroke or the "home" position and shut down regardless of its operating condition when the air supply is connected. Such movement is a safety feature to prevent inadvertent damage to the workpiece or injury to the operator.

When it is desired to operate peck feed drill 10, the operator pushes start button 302 (FIG. 6). This changes the status of master valve 304 shifting power valve 318. Motor gear quill assembly 100 and feed control assembly 200 then move forward together as piston assembly 150. The operator will have already determined how much rapid advance of the peck feed drill is desired by adjusting knob 207 in assembly 206; that is, how far peck feed drill 10 may move forward at a rapid rate before the velocity is slowed to controlled feed.

Air Logic Circuitry

The pneumatic air logic control circuitry 300 governs the operation of the peck feed drill 10 of the present invention. Generally, air logic circuitry 300 is located as shown in FIGS. 4 and 6 along with those portions internal to housing 12. It is important to note that the air logic circuitry 300 differs from prior art peck feed drill control circuitry in several key ways. Specifically, the master/start valve 302 accomplishes multiple functions. Power valve 318 is designed to pass a large volume of air through a small space. Construction of this valve will be explained later. Motor 102 is supplied with high pressure air through housing 12 and the motor/cushion valve assembly 160 in piston assembly 150 (FIG. 7). The same air flow which moves piston assembly 150 also operates motor 102.

When the peck feed drill is first connected to a high pressure air supply, a pulse of air is sent by pulse valve 314 through the system 300 to assure that power valve 318 and master valve 304 are moved to their off condition for operator safety. Piston assembly 150 is moved to its fully retracted or "home" position.

To start operation of peck feed drill 10, the operator presses start button 302. Before start button 302 is pressed, high pressure air acting on retract side 158 of piston 152 holds piston 152 in its fully retracted position. Pushing start button 302 causes the spool within master valve 304 to shift. Pressurized air now flows to pilot valve 320. Power valve 318 is shifted by pilot valve 320 so that high pressure air is applied to thrust surface 154 of Piston 152. This causes the motor gear quill assembly 100 and feed control assembly 200 to move together as piston assembly 150 toward the workpiece at a rapid rate.

High pressure air is supplied to motor 102 via port 600. This is because pylon 23 which positions ball 161 in motor/cushion valve 160 is removed from its seat 162 and moves through hollow space 153. High pressure air then is being supplied to motor 102 and thrust side 154 of piston 152 through pylon 23. Piston assembly 150 advances rapidly until bracket 208 contacts bumper 16 on housing 12. Equal drill time valve 312 is now activated by contact of the end 205 of rod 204. This starts the peck drill timer assembly 350. Drilling continues until the time set on the peck timer expires and a peck cycle completion signal is generated. This signals the completion of the peck cycle by shifting peck relay valve 352. Completion of a peck cycle shifts power valve 318 thus changing the air flow to retract side 158 of piston 152. Piston assembly 150 returns to the "home" position.

Peck timer circuit 350 and master valve 304 control the pecking operation. Starting the operation of peck feed drill 10 sends a signal to shift power valve 318 and blocks any signal from going to setback assembly 220 so that it does not activate when piston assembly 150 returns to its fully retracted or "home" position. The shifting of master valve 304 sends air to power valve 318 and away from setback assembly 220. As piston assembly 150 returns "home", high pressure air passes through ports 501 and 502 of depth sleeve 500 and sends an air signal through housing 12 to pneumatic control logic system 300 enabling piston assembly 150 to move back toward the workpiece again. As long as master valve 304 remains shifted in the "run" position, pecking will continue until stopped by activation of depth valve 308 or activation of stop valve 316 by hitting button 310. To assist in cushioning the cessation of rearward travel of piston assembly 150 on its retraction cycle, motor/cushion valve 160 is placed in piston 152 (FIG. 7) and interacts with pylon 23 which is mounted on back cap 26 to restrict the exhaust flow of air out of passageway 27 within pylon 23.

Note that there is a substantial difference between the areas available for pressurized air to act on thrust face 154 of the piston 154 as compared to the retract face 158 of piston 152. Reduction of speed at the end of the retraction stroke of piston 152 is due to the compression of air between the thrust face 154 of piston 152 and rear cap 26. The amount of cushioning is controlled by pylon 23 attached to back cap 26. Pylon 23 resets motor/cushion valve 160 and closes passageway 27. The closure of passageway 27 restricts the exit of air and accordingly forces rapid deceleration of piston assembly 150 on its retraction stroke.

Air Logic Schematics

A still better understanding of the air logic circuitry 300 of the peck feed drill 10 of the present invention may be had by reference to the schematic drawings. A table appears on each schematic to show operating parameters. In addition, schematic representations of the position of the rotating drill bit 110 relative to the workpiece and the position of bracket 208 relative to bumper 16 are shown. The condition of motor/cushion valve 160 is shown to the right of the schematic.

A better understanding of the schematic drawings may be had if pulse valve 314, shuttle valves 401, 402, 403 and stop valve 330 are grouped as a control module. Master valve 304, setback control assembly 220 and power valve 318 are best understood if grouped as an operating module. Grouping motor/cushion valve 160 and depth control rod valve assembly (sleeve 500 and holes 501, 503) as a running module and grouping equal drill time valve 312 peck timer assembly 350 and depth control valve 308 as a drilling module may assist those familiar with pneumatic circuitry.

Initial Connection to Air Supply

FIG. 8 shows the operation of the peck feed drill 10 following its initial connection to a source of high pressure air 900. Most of the time piston assembly 150 will be in its "home" position when hooked up to high pressure air 900. If not in the "home" position, piston assembly 150 will rapidly retract to the "home" position while motor 102 turns at low speed. Once "home", motor 102 shuts off. In FIG. 8, it may be seen that high pressure air is transmitted first through pulse valve 314. The construction of pulse valve 314 will be described below. The air flow pulse moves shuttle valves 401, 402 and 403 and cycles master valve 314 and power valve 318 to their off positions. High pressure air flows through power valve 318, pushing piston assembly 150 to its fully retracted or "home" position. High pressure air from retract side 158 of piston 152 also passes through depth sleeve 500 via orifice 501 and 503 and then through master valve 304 to setback control assembly 220 causing it to release its grip on piston rod 204. Piston assembly 150 is now in its "home" or fully retracted position and rotating drill bit 110 is completely out of the workpiece W. In motor/cushion valve 160 the position of ball 161 against pylon 23 blocks air flow to motor 102 through passageway 27 once piston assembly 150 is in the "home" position.

Pressing the Start Button

FIG. 9 describes the operation of the tool following depression of start button 302. Pushing start button 302 mechanically shifts master valve 304. This switches the high pressure air being supplied to master valve 304 from setback assembly 220 to pilot valve 320 of power valve 318. This shifts power valve 318 which in turn sends high pressure air to motor/cushion valve 160 to thrust side 154 of piston 152.

Air supplied to motor/cushion valve 160 is metered through orifice 666 to thrust surface 154 of piston 152. This causes piston 152 to advance. As piston 152 advances, ball 161 comes away from pylon 23 allowing passage of air through motor/cushion valve 160 which causes motor 102 to run at high speed. Peck feed drill 10 is now in the rapid advance stage with air from retract side 158 of piston 152 flowing through power valve 318 to exhaust (or in the case of the optional mist lubricator via the lubricator 399 to exhaust).

Piston assembly 150 is rapidly advanced toward the workpiece by full air pressure being placed on the thrust side 154 of the piston 152. The pressurized air which caused setback control assembly 220 to release the feed control rod 204 at the end of the previous drill cycle is bled out through master valve 304 to exhaust.

Controlled Feed and Drilling Cycle Beginning

As shown in FIG. 10, piston assembly 150 has completed its rapid advance cycle and has begun controlled feed into the workpiece W. Bracket 208 is in contact with bumper 16. The position of rod 209 has been set to control the position of bracket 208. Bracket 208 contacts equal drill time or peck timer valve 312. This sends high pressure air to peck timer assembly 350.

Air pressure continues to move piston 152 forward and run motor 102 at high speed. Drill bit 110 contacts workpiece W. Exit air from the retract surface 158 of piston 152 passes through power valve 318 to exhaust or through optional lubricator 399. Eventually, this flow goes to zero effectively de-activating the optional lubricator 399.

Air flowing through adjustable valve 313 in peck timer assembly 350 begins filling reservoir 360. To reduce the number of parts in peck feed drill 10, reservoir 360 is formed by machining a pocket into one of the manifold plates which contain air logic circuitry 300. The time taken to fill reservoir 360 is controlled by adjustment of variable flow valve 313. This determines the time of controlled feed. Slow fill of reservoir 360 means a longer period of controlled feed and actual drilling. Fast fill of reservoir 360 reduces the time for controlled feed and actual drilling.

Motor/cushion valve 160 is completely away from pylon 23. This permits maximum flow of air to motor 102.

Drilling Cycle

In FIG. 11, reservoir 360 in peck timer assembly 350 is nearly filled by air through valve 312. Drilling of workpiece W is ongoing. Peck feed drill 10 is approaching the point at which retraction of piston assembly 150 will begin. High pressure air continues to act on the thrust face 154 of piston 152 and operates motor 102. There is no change in the operation and position of motor/cushion valve 160 from the previous figure.

Retraction Begins

In FIG. 12, the controlled feed and drilling cycle has been completed as reservoir 360 has been filled to a high enough pressure to shuttle peck relay valve 352. This allows high pressure air to reposition shuttle valve 403 and flow to pilot valve 320 causing power valve 318 to cycle. As a result, high pressure air now impacts on retract side 158 of piston 152 retracting piston assembly 150.

The switching of air pressure on piston 152 causes ball 161 in motor/cushion valve 160 to shift. This restricts air flow to motor 102. Restriction of air flow changes motor 102 speed from high to low as pressure increases to motor 102 and decreases on thrust face 154 of piston 152. Lower motor speed results because flow from the retract side 158 of the piston 152 to motor 102 is controlled by a small orifice thus retaining sufficient air pressure to piston to retract piston assembly 150. It must be kept in mind that the effective area on the retract side 158 of the piston 152 is much smaller than on the thrust side 154. Therefore, maintenance of sufficient air pressure to retract piston assembly 150 is essential. As the retraction cycle occurs, drill bit 110 will be withdrawn from workpiece W and bracket 208 move away from bumper 16.

Retraction Continues

In FIG. 13, high pressure air continues to impact on the retract face 158 of piston 152 as the retraction cycle continues. Drill bit 110 has now exited from workpiece W and bracket 208 has separated from bumper 16. High pressure air passes through hole 610 to motor/cushion valve 160. Clutching piston rod 204 in its setback position keeps piston rod 204 and bracket 208 from extending back toward the front of peck feed drill 10. Exhaust air from controlled volume 360 in peck timer assembly 350 exits through equal drill time valve 312. Motor/cushion valve 160 remains in the same position as in the previous figure.

Retraction Completing

In FIG. 14, the retraction cycle is almost complete. Piston assembly 150 will be ready to return back toward workpiece W at the completion of the retraction stroke. High pressure air is still acting on the retract side 158 of piston 152, thus pushing it backward. When the fully "home" position is reached, air flow passes through holes 501 and 503 via housing 12 and master valve 304 to pilot valve 320. This shifts power valve 318 so that high pressure air is once again supplied to the motor 102 and to the thrust side 154 of piston 152.

Pylon 23 contacts ball 161 in motor cushion valve 160 thus moving ball 161 off its seat on O-ring seal 162. Cushioning of rearward piston 152 travel is accomplished by the controlled bleeding of air through orifice 666.

Drilling Depth Reached

In FIG. 15, peck feed drill 10 has reached its preset drill depth. Bracket 208 is in contact with bumper 16. Drill bit 110 is through workpiece W. Depth control rod 212 contacts depth control valve 308. This opens depth control valve 308 to a source of high pressure air 900. Shuttle valves 402 and 403 are repositioned by this air flow. This causes both master 304 and power valve 318 to recycle just as when a stop signal is sent (described below). Drill depth can be reached at anytime, even in the midst of an inward peck of the peck feed drill 10. Note that reservoir 360 is still in the process of being filled in FIG. 15, but will not have a chance to shift power valve 318 if depth control valve 308 is contacted. As soon as the desired drill depth is reached, piston assembly 150 begins its final retraction operation. Motor/cushion valve 160 is in the same condition as during actual drilling.

Post Drill Depth—Retraction Continues

Continuation of the retraction cycle following attainment of desired drill depth is shown in FIG. 16. High pressure air acts on the retract side 158 of piston 152 causing the motor supply air to pass through hole 610 to motor/cushion valve 160. Motor 102 speed becomes low.

Post Drill Depth—Retract Complete

In FIG. 17, retraction of piston assembly 150 has been nearly completed after the desired drill depth signal has been reached. The air flow through holes 501 and 503 via housing 12 through master valve 304 release rod 204 clutching function of setback control 220 is shown by a dashed line. Air compressed against end cap 26 exits through power valve 318 to exhaust or optional lubricator 399 as shown by a dashed line. Pylon 23 repositions ball 161 in motor/ cushion valve 160. Setback assembly 220 does not release rod 204 until hole 503 clears O-ring seal 505 (FIG. 5) at the very end of the retraction stroke.

Post Drill Depth—Retraction Complete

In FIG. 18, piston assembly 150 has returned to the "home" position. Hole 503 has cleared O-ring seal 505, thus sending a signal through housing 12 to setback control assembly 220. Air flow to motor 102 is cut-off by motor/ cushion valve 160 similar to FIG. 8.

Stop Signal

A similar operation to the retraction of the piston assembly 150 occurs when a stop signal is sent. This is shown in FIG. 19. Pressing stop button 310 cycles stop valve 330 and repositions shuttle valves 401, 402 and 403. This causes master valve 304 and power valve 318 to recycle as described above when the preset depth has been reached. No motor/cushion valve 160 is shown as the stop button 310 may be.

Pulse Valve Construction

Pulse valve 314 includes a hollow substantially U-shaped chamber 702. The open end 704 of U-shaped chamber 702 is closed by cap 706. Continued within chamber 702 is piston element 708. Surrounding piston element 708 is ring seal 710. Urging piston element 708 toward open end 704 is spring 712. When high pressure air is supplied to that side 714 of piston element 708 nearest open end 704, piston element 708 slides toward closed end 716 of chamber 702. Ring seal 710 permits air flow around piston element 708 until piston element 708 contacts shoulder 718. Air flow is stopped by the sealing action of ring seal 710 against shoulder 718. The action of valve 314 thus provides a pulse of air while piston element 708 is sliding from the open end 704 of chamber 702 to shoulder 718. The pulse ends when ring seal 710 contacts shoulder 718.

Power Valve Construction

Power valve 318 permits the flow of a large volume of high pressure air in a small space. Operation of power valve 318 is controlled by pilot valve 320. Pilot valve 320 is a piston 752 contained in a cylinder 754. Shaft 756 connects piston 752 to the main portion of power valve 318. The main portion of power valve 318 includes an oblong chamber 758 constructed and arranged to permit the travel of element 760 from one end to the other. Chamber 758 includes an opening 762 for high pressure air, an opening 764 to the thrust side 154 of piston 152, an opening 766 to the retract side of piston 158 and a pair of exhaust ports 768 and 770. Movement of piston 752 back and forth selects which pair of holes will permit air flow. In the position shown in FIG. 6 air flow is permitted between opening 764 and exhaust port 768. If piston 752 is moved to the opposite end of cylinder 754, air flow is permitted between port 766 and exhaust port 770.

There is hereby provided by the peck feed drill 10 of the present invention a low weight, small size tool which because of its low weight and small size may be used in an increased variety of applications where heretofore peck feed drills have never been used.

Changes and modifications to the foregoing, specifically described preferred embodiment may be carried out by those of ordinary skill in the art without departing from the scope of invention. The scope of invention is intended to be limited only by the scope of the appended claims.

What is claimed is:

1. A peck feed drill, comprising:

a housing having a bore therein;

an advancing and retracting motor gear quill disposed to be extended from said bore;

a feed control system for regulating the advancement and retraction of said motor quill;

a piston assembly disposed in said bore and constructed and arranged to simultaneously advance and retract both said motor gear quill and said feed control system.

2. The peck feed drill as defined in claim 1 wherein said housing receives both said motor gear quill and said feed control system.

3. The peck feed drill as defined in claim 1 wherein said feed control system includes a cylinder having an internal piston disposed therein, said internal piston including a piston rod extending therefrom.

4. The peck feed drill as defined in claim 3 wherein said piston rod extends outward from said cylinder and a bracket is attached to the end of said piston rod, said bracket being constructed and arranged to contact said housing when said feed control system has been advanced to a preselected distance toward the workpiece.

5. The peck feed drill as defined in claim 3 wherein said internal piston within said cylinder assembly is a dampening piston.

6. The peck feed drill as defined in claim 4 whereby regulation of the rate of travel of said motor gear quill is initiated when said bracket contacts an inner wall of said housing.

7. The peck feed drill as defined in claim 6 wherein a bumper is mounted on said inner wall of said housing to cushion the impact of said bracket with said inner wall of said housing.

8. The peck feed drill as defined in claim 3 further including a setback control assembly to regulate the length of travel of said piston within said cylinder.

9. The peck feed drill as defined in claim 3 whereby a setback assembly is mounted on the front of said cylinder.

10. The peck feed drill as defined in claim 9 wherein said setback assembly is air operated.

11. The peck feed drill as defined in claim 10 wherein said setback assembly has a first position in which said rod may pass therethrough and a second position wherein said rod is prevented from moving with respect thereto.

12. The peck feed drill as defined in claim 11 wherein the engagement of said setback assembly on said rod at said second position may occur at different positions on said rod.

13. The peck feed drill as defined in claim 12 wherein said setback assembly is controlled by the pressure of ambient air within said housing.

14. The peck feed drill as defined in claim 2 wherein said piston assembly has two substantially circular ends and two substantially straight sides extending from said substantially circular ends.

15. The peck feed drill as defined in claim 14 wherein said piston assembly forms an axial sleeve bearing surface.

16. The peck feed drill as defined in claim 15, wherein the interaction of said piston assembly with said housing maintains the relative positioning of said motor gear quill and said feed control system in said housing.

17. The peck feed drill as defined in claim 16 wherein said feed control system and said motor gear quill are arranged side-by-side on said piston assembly, said piston assembly guides the advancement and retraction of said motor gear quill and feed control system in said housing, said piston assembly further absorbs moments created by the operation of said peck feed drill.

18. The peck feed drill as defined in claim 4 wherein said bracket is received on a first threaded rod which extends outward from said cylinder, and the position of said bracket with respect to said cylinder is adjustable by the positioning of said first threaded rod with respect to said cylinder.

19. The peck feed drill as defined in claim 18 wherein said housing includes a signal valve disposed therein in alignment with the end of said first threaded rod extending from said cylinder, and said end engages said valve to provide a mechanical signal corresponding to the engagement of the drill bit with the workpiece.

20. The peck feed drill as defined in claim 18 wherein the feed control assembly includes a second threaded rod disposed adjacent said cylinder and moveable therewith, and said housing includes a depth valve actuator disposed in alignment with said rod and engageable with said rod to provide a mechanical signal at the attainment of a preset drilling depth.

21. The peck feed drill as defined in claim 20 wherein said second threaded rod includes an air passage therethrough, said air passage in said second threaded rod has a first, unblocked position and a second, blocked position, said blocked and unblocked positions used to control the operation of said setback control assembly by allowing pressurized air to pass to said housing and to air logic circuit means.

22. An air feed drill, the improvement therein comprising:

a housing having a bore therein;

a drill quill and a feed control assembly disposed in said bore and moveable with respect thereto; and a piston disposed in said bore and interconnected to said feed control assembly and said motor gear quill.

23. The air feed drill of claim 22, wherein said bore is shaped to allow side-by-side arrangement of said drill quill and said feed control assembly, said piston has a mating profile with said bore.

24. The air feed drill of claim 23, wherein said piston and said bore include opposed, parallel sides and rounded ends.

25. The air feed drill of claim 22, wherein said bore includes a first end and a second end, said piston disposed intermediate said first end and second end and moveable in the direction of said first end to advance the drill bit into the workpiece, said feed control assembly including a dampening cylinder disposed on said piston and a rod extending therefrom and having a distal end portion selectively engageable with said second end.

26. The peck feed drill as defined in claim 1 further including a motor speed valve mounted in said piston assembly.

* * * * *